(12) United States Patent
Bang et al.

(10) Patent No.: US 12,294,233 B2
(45) Date of Patent: May 6, 2025

(54) PORTABLE DEVICE COMMUNICATING WITH CHARGER AND METHOD OF OPERATING THE SAME

(71) Applicant: Samsung Electronics Co., Ltd., Suwon-si (KR)

(72) Inventors: Sangun Bang, Seongnam-si (KR); Dongjo Kim, Suwon-si (KR); Jinsoo Lee, Hwaseong-si (KR); Woonhyung Heo, Seoul (KR); Dongjoon Kim, Seoul (KR); Sungeun Lee, Hwaseong-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 0 days.

(21) Appl. No.: 18/299,377

(22) Filed: Apr. 12, 2023

(65) Prior Publication Data

US 2023/0253811 A1    Aug. 10, 2023

Related U.S. Application Data

(63) Continuation of application No. 17/315,823, filed on May 10, 2021, now Pat. No. 11,652,356.

(30) Foreign Application Priority Data

Aug. 21, 2020    (KR) .................. 10-2020-0105535

(51) Int. Cl.
*H02J 7/00*     (2006.01)
*H04B 1/3827*   (2015.01)
*H04B 3/02*     (2006.01)

(52) U.S. Cl.
CPC ........ *H02J 7/0068* (2013.01); *H02J 7/00306* (2020.01); *H04B 1/3827* (2013.01); *H04B 3/02* (2013.01)

(58) Field of Classification Search
CPC .. H02J 7/0068; H02J 7/00306; H02J 2310/22; H02J 7/00034; H02J 50/80;
(Continued)

(56) References Cited

U.S. PATENT DOCUMENTS 6,995,963 B2    2/2006  Fadell et al.
8,237,414 B1    8/2012  Li et al.
(Continued)

FOREIGN PATENT DOCUMENTS

JP    2009-027479 A    2/2009
JP    2010-041303 A    2/2010
(Continued)

OTHER PUBLICATIONS

Final Office Action, dated Sep. 17, 2024, issued in U.S. Appl. No. 17/315,834.
(Continued)

*Primary Examiner* — Sung S Ahn
(74) *Attorney, Agent, or Firm* — Harness, Dickey & Pierce, P.L.C.

(57) ABSTRACT

A portable device includes: a modem configured to perform power line communication with a charger external to the portable device; and a charging circuit configured to, from first power provided by the charger, charge a battery and supply power to an electrical load, wherein the charging circuit is further configured to cut off the supply of the first power to the electrical load and supply second power from the battery to the electrical load.

18 Claims, 24 Drawing Sheets

(58) Field of Classification Search
CPC .... H02J 7/00309; H02J 7/0031; H02J 7/0045; H02J 7/00302; H02J 7/0047; H04B 1/3827; H04B 3/02; H04B 5/79; H04M 1/72409
See application file for complete search history.

(56) References Cited

U.S. PATENT DOCUMENTS

| | | | |
|---|---|---|---|
| 8,461,807 | B2 | 6/2013 | Senriuchi et al. |
| 9,130,659 | B2 | 9/2015 | Nii et al. |
| 9,197,100 | B2 | 11/2015 | Ichikawa |
| 9,312,576 | B2 | 4/2016 | Hung et al. |
| 9,466,860 | B2 | 10/2016 | Noda et al. |
| 9,843,853 | B2 | 12/2017 | Hirsch et al. |
| 10,104,463 | B2 | 10/2018 | Kim et al. |
| 10,560,576 | B1 | 2/2020 | Kim et al. |
| 2004/0109499 | A1 | 6/2004 | Cern |
| 2004/0113587 | A1 | 6/2004 | Bohne et al. |
| 2008/0049606 | A1 | 2/2008 | Rhelimi et al. |
| 2008/0246433 | A1 | 10/2008 | Kim et al. |
| 2009/0184688 | A1 | 7/2009 | Kim et al. |
| 2010/0026247 | A1 | 2/2010 | Kim |
| 2010/0039066 | A1 | 2/2010 | Yuan et al. |
| 2010/0175094 | A1 | 7/2010 | Ono |
| 2011/0221604 | A1* | 9/2011 | Johnson .............. H02J 7/0071 320/162 |
| 2012/0256596 | A1 | 10/2012 | Wada et al. |
| 2013/0038274 | A1 | 2/2013 | Forsythe |
| 2013/0320947 | A1 | 12/2013 | Noh et al. |
| 2014/0306660 | A1* | 10/2014 | Suzuki .............. H02J 7/0045 320/110 |
| 2014/0333262 | A1 | 11/2014 | Ochiai et al. |
| 2015/0311806 | A1 | 10/2015 | Kim et al. |
| 2015/0326969 | A1 | 11/2015 | Tu et al. |
| 2015/0365132 | A1 | 12/2015 | Yu |
| 2016/0006292 | A1 | 1/2016 | Hatanaka et al. |
| 2016/0080141 | A1 | 3/2016 | Theiler et al. |
| 2017/0093454 | A1 | 3/2017 | Chawan et al. |
| 2017/0166073 | A1* | 6/2017 | Park .............. B60L 53/60 |
| 2018/0248414 | A1 | 8/2018 | Liu et al. |
| 2018/0312072 | A1* | 11/2018 | Yang .............. B60L 55/00 |
| 2019/0075385 | A1 | 3/2019 | Lee et al. |
| 2019/0098396 | A1 | 3/2019 | Shin et al. |
| 2019/0289382 | A1 | 9/2019 | Chawan et al. |
| 2020/0052526 | A1 | 2/2020 | Ueda |

FOREIGN PATENT DOCUMENTS

| | | |
|---|---|---|
| JP | 2015-07694 A | 4/2015 |
| JP | 2019-220882 A | 12/2019 |
| KR | 10-2018-0093322 A | 8/2018 |
| KR | 102071268 B1 | 1/2020 |
| KR | 10-2020-0016636 A | 2/2020 |

OTHER PUBLICATIONS

Korean Office Action, dated Jan. 13, 2025, issued in Korean Patent Application No. 10-2020-0105535.
Notice of Allowance issued Feb. 27, 2025 in U.S. Appl. No. 17/315,834.

* cited by examiner

PORTABLE DEVICE COMMUNICATING WITH CHARGER AND METHOD OF OPERATING THE SAME

CROSS-REFERENCE TO RELATED APPLICATION

This application is a continuation of U.S. patent application Ser. No. 17/315,823, filed on May 10, 2021, which is based on and claims priority under 35 U.S.C. § 119 to Korean Patent Application No. 10-2020-0105535, filed on Aug. 21, 2020, in the Korean Intellectual Property Office, the disclosure of each of which is incorporated by reference herein in its entirety.

BACKGROUND

The inventive concepts relate to a portable device including a battery, and more particularly, to a portable device communicating with a battery and a method of operating the portable device.

Portable devices including batteries have been broadly used. Portable devices may have structures in which batteries thereof are replaced when the batteries run out, or may include rechargeable batteries. Rechargeable batteries included in portable devices may be charged from power provided by chargers connected to the portable devices. Portable devices including such rechargeable batteries may communicate with chargers for purposes of quick charging, battery protection, overheating prevention, high-efficiency charging, and/or the like, and thus, more efficient and/or more accurate communication between the portable devices and the chargers may be advantageous.

SUMMARY

The inventive concepts provide a portable device more efficiently and/or more accurately communicating with a charger and a method of operating the portable device.

According to an aspect of the inventive concepts, there is provided a portable device including: a modem configured to perform power line communication with a charger external to the portable device; and a charging circuit configured to, from first power provided by the charger, charge a battery and supply power to an electrical load, wherein the charging circuit is further configured to cut off the supply of the first power to the electrical load and supply second power from the battery to the electrical load, during a first period including a period in which the power line communication occurs.

According to another aspect of the inventive concepts, there is provided a portable device including: a first terminal and a second terminal, each contacting a charger external to the portable device; a modem configured to perform power line communication with the charger via the first terminal and/or the second terminal; a charging circuit connected to the first terminal, the second terminal, a battery, and an electrical load, wherein the charging circuit includes: a first switch connected between the first terminal and the electrical load; a second switch connected between the electrical load and the battery; and a switch controller configured to turn off the first switch and turn on the second switch, during a first period including a period in which the power line communication occurs.

According to yet another aspect of the inventive concepts, there is provided a method of operating a portable device for performing power line communication with a charger external thereto, the method including: during a first period including a period in which the power line communication occurs, cutting off supply of first power, which is provided by the charger, to an electrical load and supplying second power from a battery to the electrical load; and, when the first period is terminated, from the first power, charging the battery and supplying power to the electrical load.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
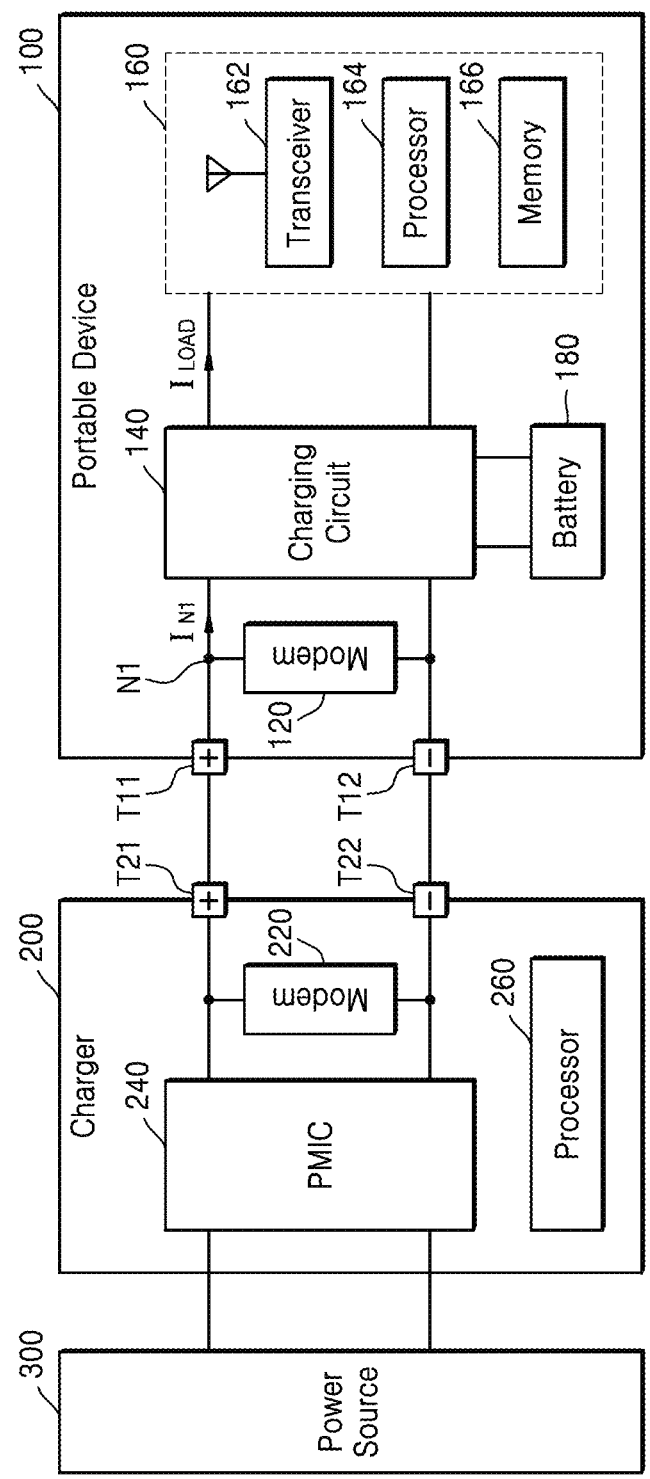
FIG. 1 is a block diagram illustrating a portable device according to example embodiments of the inventive concepts.

FIG. 1 is a block diagram illustrating a portable device 100 according to example embodiments of the inventive concepts. For example, the block diagram of FIG. 1 illustrates the portable device 100, a charger 200 connected to the portable device 100, and/or a power source 300 connected to the charger 200.

The charger (or charging device) 200 may provide power to the portable device 100, based on power provided by the power source 300. In some example embodiments, the power source 300 may provide an AC voltage, and the charger 200 may provide, to the portable device 100, a DC voltage generated from the AC voltage. In some example embodiments, the power source 300 may provide, to the charger 200, a first DC voltage generated from an AC voltage, and the charger 200 may provide, to the portable device 100, a second DC voltage generated from the first DC voltage. In some example embodiments, as described below with reference to FIG. 17, the charger 200, which may also be a portable device, may include a rechargeable battery, and the rechargeable battery of the battery 200 may be charged from power provided by the power source 300.

As shown in FIG. 1, the charger 200 may include a modem 220, a power management integrated circuit (PMIC) 240, and/or a processor 260 and may include a first terminal T21 and a second terminal T22, which are respectively connected to a first terminal T11 and a second terminal T12 of the portable device 100. The first terminal T21 and the second terminal T22 of the charger 200 may be electrically connected to the first terminal T11 and the second terminal T12 of the portable device 100 via cables, respectively, or may be directly connected to the first terminal T11 and the second terminal T12 of the portable device 100, respectively. Herein, it is assumed that the first terminal T21 of the charger 200 and the first terminal T11 of the portable device 100 have higher electric potentials than the second terminal T22 of the charger 200 and the second terminal T12 of the portable device 100.

The modem 220 may be connected to the first terminal T21 and the second terminal T22 of the charger 200 and may perform power line communication (PLC) with the portable device 100 via the first terminal T21 and/or the second terminal T22. For example, the modem 220 may transmit a packet, which is generated by encoding and modulating data provided by the processor 260, to the portable device 100 and may provide data, which is generated by decoding and demodulating the packet received from the portable device 100, to the processor 260.

The PMIC 240 may generate power, which is supplied to the portable device 100, from power provided by the power source 300. For example, the PMIC 240 may include at least one regulator for generating DC voltages, at least one sensor for sensing currents and/or voltages, at least one power switch for selectively cutting off currents and/or voltages, and at least one passive element such as a capacitor and/or a diode. In addition, in some example embodiments, when the charger 200 receives an AC voltage from the power source 300, the PMIC 240 may include a converter for generating a DC voltage from the AC voltage. Power, which the charger 200 provides to the portable device 100 by using the PMIC 240, may be referred to as first power.

The processor 260 may communicate with the portable device 100 via the modem 220 and may control the PMIC 240. For example, the processor 260 may identify information, a state, or the like of the portable device 100, based on data received from the portable device 100 via the modem 220, and may transmit data including information, a state, or the like of the charger 200 to the portable device 100 via the modem 220. For example, the processor 260 may control the PMIC 240, based on the information and/or the state of the portable device 100, and thus, the first power provided to the portable device 100 may be controlled. In some example embodiments, the processor 260 may include a logic circuit including a state machine and may include at least one core executing a series of instructions.

The portable device 100 may include a battery 180 and may be any device independently operable based on power provided by the battery 180. For example, the portable device 100 may include a computing device such as a laptop computer, a tablet personal computer (PC), or a mobile phone, an input/output device such as a wireless keyboard, a wireless mouse, or a wireless speaker, a wearable device such as smart glasses, a smart watch, a smart band, or wireless earphones, and a transport device such as an electric vehicle, an electric bicycle, or an electric kickboard. The battery 180 included in the portable device 100 may include a rechargeable battery. As shown in FIG. 1, the portable device 100 may be connected to the charger 200 and may charge the battery 180 from the power provided by the charger 200, that is, the first power. The rechargeable battery may be simply referred to as a battery. As shown in FIG. 1, the portable device 100 may include a modem 120, a charging circuit 140, and/or an electrical load 160, in addition to the battery 180, and may include the first terminal T11 and the second terminal T12, which are respectively connected to the first terminal T21 and the second terminal T22 of the charger 200.

The modem 120 may be connected to the first terminal T11 and the second terminal T12 of the portable device 100 and may perform power line communication with the charger 200, that is, the modem 220 of the charger 200, via the first terminal T11 and/or the second terminal T12. For example, the modem 120 may transmit a packet, which is generated by encoding and modulating data provided by a processor 164 of the electrical load 160, to the charger 200 and may provide data, which is generated by decoding and demodulating the packet received from the charger 200, to the processor 164. An example of the modem 120 will be described below with reference to FIG. 2.

The charging circuit 140 may charge the battery 180 from the first power provided by the charger 200 and may provide power to the electrical load 160. In addition, the charging circuit 140 may provide power, which is provided by the battery 180, to the electrical load 160. The power, which the battery 180 provides to the electrical load 160, may be referred to as second power. For example, the charging circuit 140 may charge the battery 180 by supplying at least a portion of the first power to the battery 180 and may cut off the supply of the first power to the battery 180 when the charging of the battery 180 is completed. In addition, when the portable device 100 is disconnected from the charger 200, the charging circuit 140 may supply the second power to the electrical load 160, and when the battery 180 is overdischarged, the portable device 100 may cut off the supply of the second power to the electrical load 160. Examples of the charging circuit 140 will be described below with reference to FIG. 5 and the like.

The electrical load 160 may perform an operation for a function provided by the portable device 100, based on power supplied by the charging circuit 140. For example, as shown in FIG. 1, the electrical load 160 may include a transceiver 162, the processor 164, and/or a memory 166, and the transceiver 162, the processor 164, and the memory 166 may be operated based on the power supplied by the charging circuit 140, that is, at least a portion of the first power and/or the second power. In some example embodiments, the modem 120 may also be operated based on the power supplied by the charging circuit 140 and may be referred to as an electrical load. The electrical load may be referred to as a load or a load circuit.

The transceiver 162 may be connected to an antenna and may perform wireless communication with a host device (for example, 40 of FIG. 17) and/or another portable device. For example, the transceiver 162 may perform mobile communication such as long term evolution (LTE) and $5^{th}$ generation new radio (5G NR) of the $3^{rd}$ generation partnership project (3GPP), may perform communication based on a wireless personal area network (PAN) such as Bluetooth, Li-Fi, Wireless USB, or Zigbee, may perform communication based on a wireless local area network (LAN) such as Wi-Fi, or may perform near-field communication (NFC). The transceiver 162 may consume relatively high power, and in particular, may consume high power during transmission of signals via the antenna. Accordingly, while wireless communication is performed by the transceiver 162 in a state in which the portable device 100 is connected to the charger 200, a current $I_{N1}$ flowing from the first terminal T11 to the charging circuit 140, at a first node connected to the first terminal T11, may increase. Although it is assumed that the portable device 100 includes, as the electrical load 160, the transceiver 162 for wireless communication, it should be noted that the portable device 100 may include any electrical load performing an operation for a function provided by the portable device 100.

The processor 164 may communicate with the charger 200 via the modem 120 and may control other components of the portable device 100. For example, the processor 164 may identify the information, the state, or the like of the charger 200, based on data received from the charger 200 via the modem 120, and may transmit data including the information, the state, or the like of the portable device 100 to the charger 200 via the modem 120. In addition, the processor 164 may transmit data to another device via the transceiver 162 and may receive data, which is transmitted by the other device, via the transceiver 162. In some example embodiments, the processor 164 may include a logic circuit including a state machine and may include at least one core executing a series of instructions.

The memory 166 may store instructions (or software) executed by the processor 164, may store data transmitted or received via the modem 120, and may store data transmitted or received via the transceiver 162. In some example embodiments, the memory 166 may include a volatile memory device such as dynamic random access memory (DRAM) or static random access memory (SRAM), or a non-volatile memory device such as flash memory or resistive random access memory (RRAM).

As described below with reference to FIGS. 4 and 11, noise may be generated due to various causes, and power line communication between the portable device 100 and the charger 200 may be affected by the noise. For example, the modem 120 of the portable device 100 and/or the modem 220 of the charger 200 may misidentify the noise as a signal transmitted by a counterpart, and a signal transmitted to the counterpart by the modem 120 and/or the modem 220 may be distorted by the noise. As described below with reference to figures, the portable device 100 may allow communication with the charger 200 to be free from noise, and thus, the communication between the portable device 100 and the charger 200 may be more efficiently and/or more accurately performed. In addition, due to the more efficient and/or more accurate communication between the portable device 100 and the charger 200, desirable functions, for example, quick charging, battery protection, overheating prevention, high-efficiency charging, and/or the like, of the portable device 100 may be readily achieved. Further, due to the more efficient and/or more accurate power line communication, the portable device 100 may be simply connected to the charger 200, and the portable device 100 and/or the charger 200 may have a simple structure.

Figure 2:
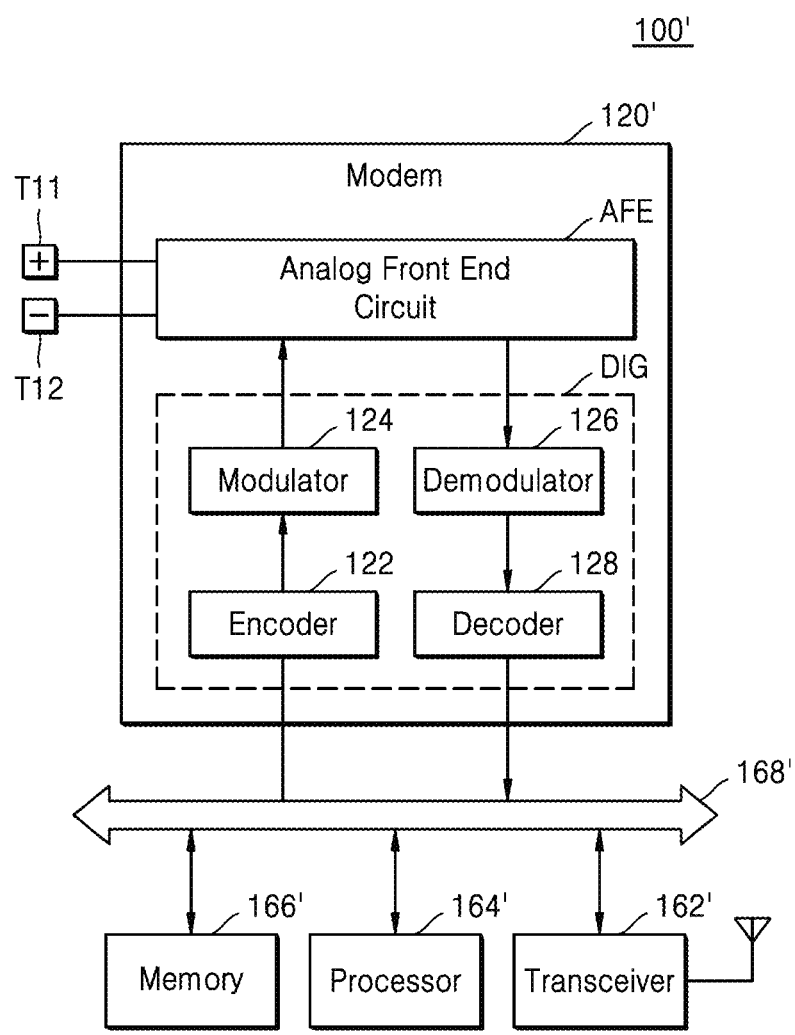
FIG. 2 is a block diagram illustrating a portable device according to example embodiments of the inventive concepts.

FIG. 2 is a block diagram illustrating a portable device 100' according to example embodiments of the inventive concepts. Similarly to the portable device 100 of FIG. 1, the portable device 100' of FIG. 2 may include a modem 120' and may include, as electrical loads, a transceiver 162', a processor 164', a memory 166', and/or a bus 168'. The modem 120', the transceiver 162', the processor 164', and the memory 166' may communicate with each other via the bus 168'. In the following descriptions regarding FIG. 2, repeated descriptions given with reference to FIG. 1 are omitted.

The modem 120' may be connected to the first terminal T11 and the second terminal T12. In addition, the modem 120' may be connected to the bus 168' and may generate a packet from data provided via the bus 168' and transmit the packet via the first terminal T11 and/or the second terminal T12 or may generate data from a packet received via the first terminal T11 and/or the second terminal T12 and transmit the data to the bus 168'. As shown in FIG. 2, the modem 120' may include an analog front-end circuit AFE, an encoder 122, a modulator 124, a demodulator 126, and/or a decoder 128, and the encoder 122, the modulator 124, the demodulator 126, and the decoder 128 may be collectively referred to as a digital circuit DIG.

The encoder 122 may receive data from the processor 164' or the memory 166' via the bus 168'. The encoder 122 may encode data according to a format shared with the charger 200 and may provide the encoded data to the modulator 124. In some example embodiments, the encoder 122 may further encode a header in addition to data. The modulator 124 may modulate the encoded data according to a modulation method shared with the charger 200 and may provide a modulated signal to the analog front-end circuit AFE. The analog front-end circuit AFE may output a signal to the first terminal T11 and/or the second terminal T12, based on the modulated signal. For example, the analog front-end circuit AFE may output a signal based on current modulation.

The analog front-end circuit AFE may provide the modulated signal, which is received via the first terminal T11 and/or the second terminal T12, to the demodulator 126. For example, the analog front-end circuit AFE may provide a signal, which is received based on voltage modulation, to the demodulator 126. The demodulator 126 may demodulate the modulated signal according to the modulation method shared with the charger 200 and may provide the demodulated signal to the decoder 128. The decoder 128 may decode the demodulated signal according to the format shared with the charger 200 and may transmit decoded data to the processor 164' or the memory 166' via the bus 168'. In some example embodiments, the decoder 128 may further decode a header in addition to data. In addition, in some example embodiments, the decoder 128 may further output information about errors occurring during reception.

Figure 3A:
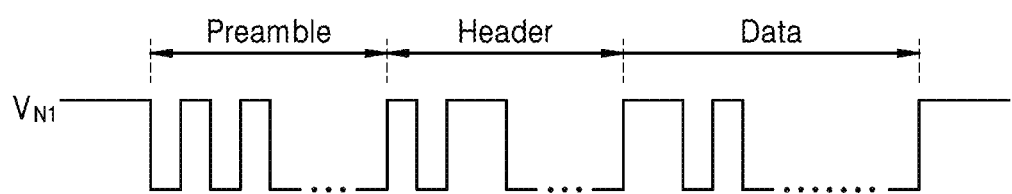
FIGS. 3A and 3B are timing diagrams illustrating examples of packets, according to example embodiments of the inventive concepts.
Figure 3B:
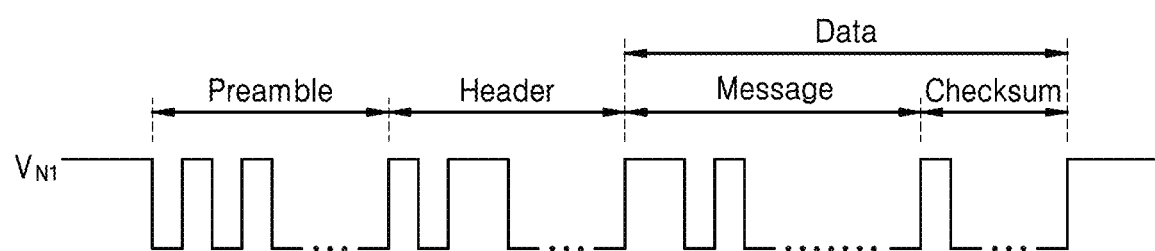

FIGS. 3A and 3B are timing diagrams illustrating examples of packets, according to example embodiments of the inventive concepts. For example, the timing diagrams of FIGS. 3A and 3B each illustrate a voltage $V_{N1}$ of a first node N1 with the lapse of time, the voltage $V_{N1}$ of the first node N1 corresponding to a packet that refers to a unit of transmission or reception in power line communication between the portable device 100 and the charger 200 in FIG. 1. Hereinafter, descriptions regarding FIGS. 3A and 3B will be made with reference to FIG. 1, and it is assumed that the modem 120 of the portable device 100 transmits a packet. In the descriptions regarding FIGS. 3A and 3B, repeated descriptions given with reference to each other are omitted.

Referring to FIG. 3A, in some example embodiments, a packet may sequentially include a preamble, a header, and/or data, in the stated order. The preamble may include a series of pulses, and a reception side may detect a frequency, a duty, and/or the like, which are used in transmission, based on the pulses included in the preamble. For example, the preamble may include the pulses which are used in the header and the data and have minimum pulse widths, the header and the data being subsequent to the preamble. The header may include information about attributes of the data that is subsequent to the header. For example, the header may indicate that a value represented by the data is version information or is a currently measured voltage of the battery 180. In some example embodiments, the header may include a start bit and/or a parity bit. In addition, in some example embodiments, the data may include a parity bit and/or a stop bit.

Referring to FIG. 3B, in some example embodiments, a packet may sequentially include a preamble, a header, and/or data in the stated order, and the data may sequentially include a message and/or a checksum in the stated order. The checksum may be used to check the integrity of the data on a reception side, and in some example embodiments, the checksum may be between a parity bit of the data and a stop bit of the data. It will be understood that the packets shown in FIGS. 3A and 3B are merely examples, and that a packet in power line communication is not limited to the examples shown in FIGS. 3A and 3B.

Figure 4:
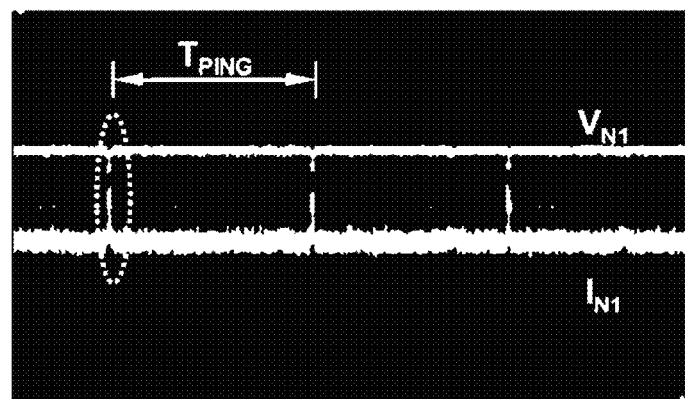
FIG. 4 illustrates an example of noise generated by a portable device, according to example embodiments of the inventive concepts.
Figure 4:
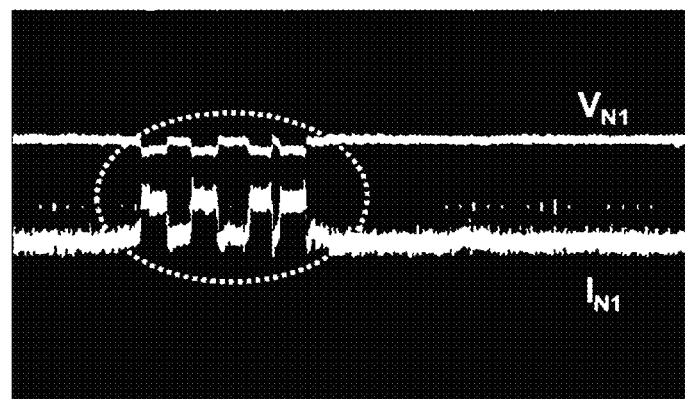

FIG. 4 illustrates an example of noise generated by a portable device, according to example embodiments of the inventive concepts. For example, FIG. 4 illustrates examples of waveforms of a voltage $V_{N1}$ and a current $I_{N1}$ of the first node N1 of FIG. 1. Hereinafter, descriptions regarding FIG. 4 will be made with reference to FIG. 1.

Referring to the upper part of FIG. 4, the transceiver 162 may periodically communicate with a host device and/or another portable device. For example, the portable device 100 may periodically transmit or receive a signal to check whether a state of connection to the host device and/or the other portable device is maintained, to maintain synchronization with the host device and/or the other portable device, and/or to search for the host device therearound and/or the other portable device therearound. As described above with reference to FIG. 1, a relatively large amount of power may be consumed by wireless communication, and thus, as shown in the upper part of FIG. 4, on every cycle $T_{PING}$ on which the wireless communication is performed, the voltage $V_{N1}$ of the first node N1 may decrease and the current $I_{N1}$ of the first node N1 may increase.

Referring to the lower part of FIG. 4, during the wireless communication, the voltage $V_{N1}$ and the current $I_{N1}$ of the first node N1 may include pulses. Accordingly, the modem 120 of the portable device 100 and/or the modem 220 of the charger 200 may misidentify the pulses, generated during the wireless communication, of the voltage $V_{N1}$ and the current $I_{N1}$ of the first node N1 as a packet (or a preamble) transmitted by a counterpart, and when the wireless communication occurs during the power line communication between the portable device 100 and the charger 200, the packet may be distorted. As such, example embodiments, in which the power line communication is more accurately performed despite noise generated during the wireless communication, will be described below with reference to FIGS. 5 to 10.

Figure 5:
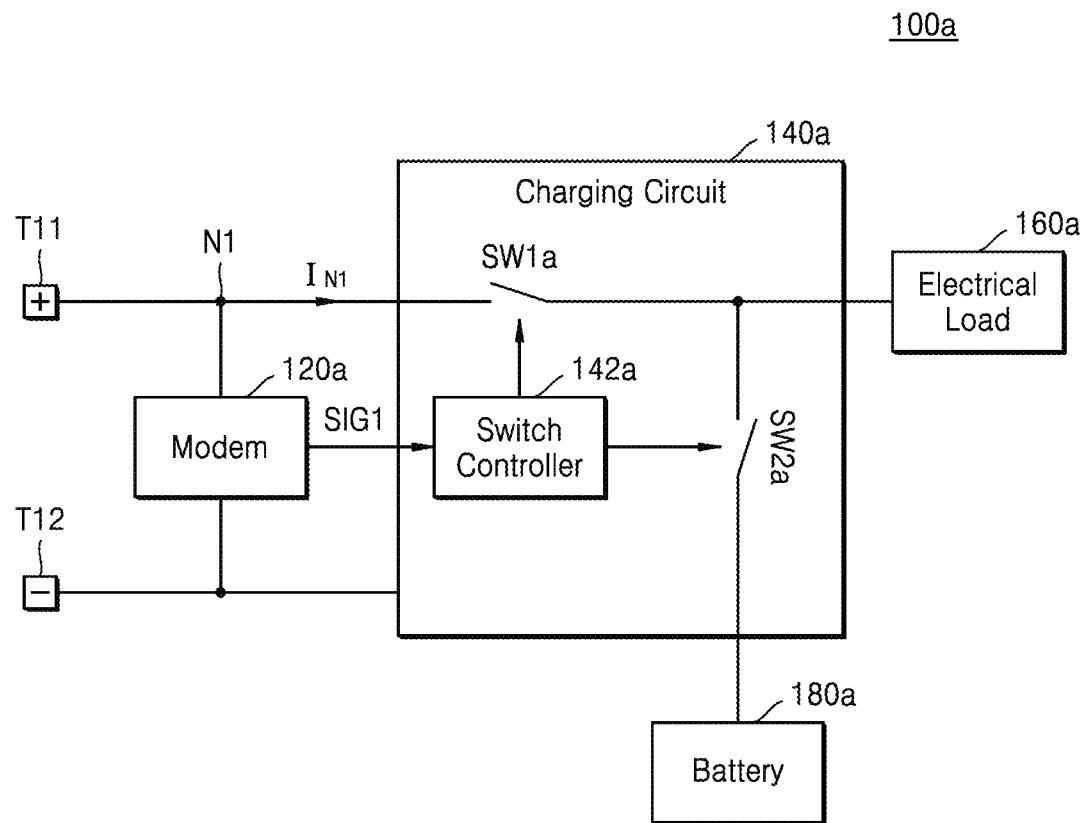
FIG. 5 is a block diagram illustrating a portable device according to example embodiments of the inventive concepts.

FIG. 5 is a block diagram illustrating a portable device 100a according to example embodiments of the inventive concepts. Similar to the portable device 100 of FIG. 1, the portable device 100a of FIG. 5 may include a modem 120a, a charging circuit 140a, an electrical load 160a, and/or a battery 180a and may include the first terminal T11 and the second terminal T12. In the following descriptions regarding FIG. 5, repeated descriptions given with reference to FIG. 1 are omitted.

The charging circuit 140a may include a first switch SW1a, a second switch SW2a, and/or a switch controller 142a. The first switch SW1a may be connected between the first terminal T11 (or the first node N1) and the electrical load 160a and may be controlled by the switch controller 142a. In addition, the second switch SW2a may be connected between the electrical load 160a and the battery 180a and may be controlled by the switch controller 142a. Each of the first switch SW1a and the second switch SW2a may have any structure capable of electrically connecting ends on both sides thereof to each other in an ON state thereof and electrically disconnecting the ends on both sides thereof from each other in an OFF state thereof. For example, each of the first switch SW1a and the second switch SW2a may include a power transistor, which is a field effect transistor (FET) having a gate connected to the switch controller 142a. The switch controller 142a may supply the first power to the electrical load 160a and/or the battery 180a by turning on the first switch SW1a and may cut off the supply of the first power by turning off the first switch SW1a. In addition, the switch controller 142a may supply the second power to the electrical load 160a by turning on the second switch SW2a and may cut off the supply of the second power by turning off the second switch SW2a.

In some example embodiments, during a period (which may be referred to as a first period) including a period in which power line communication occurs, the charging circuit 140a may cut off the supply of the first power to the electrical load 160a and supply the second power to the electrical load 160a. For example, the modem 120a may generate a first signal SIG1 activated during the first period including a period of transmitting a packet to a charger (for example, 200 of FIG. 1) through the power line communication. The switch controller 142a may receive the first signal SIG1 from the modem 120a and may identify the first period based on the activated first signal SIG1. The switch controller 142a may turn off the first switch SW1a and turn on the second switch SW2a, during the first period. Accordingly, the electrical load 160a may be operated based on the second power instead of the first power, and the first node N1 may be free from noise caused by an operation of the electrical load 160a.

Figure 6:
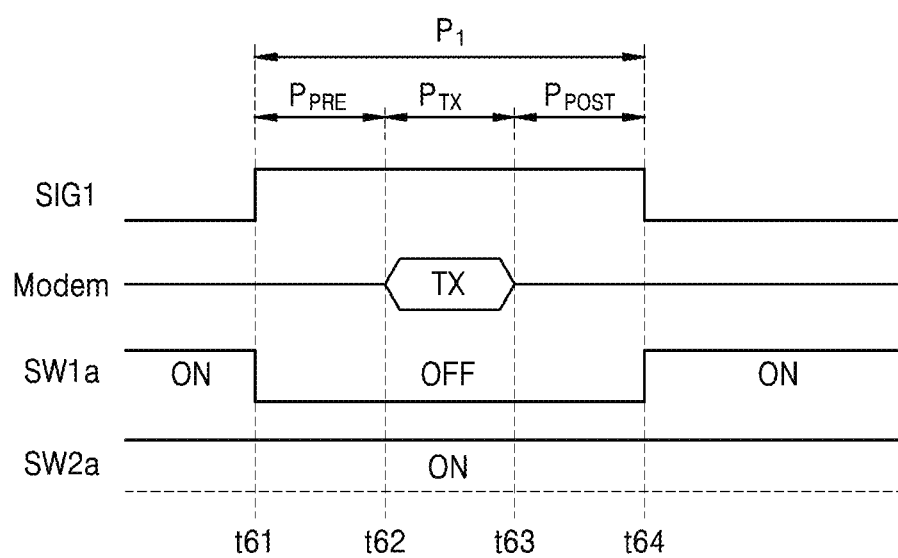
FIG. 6 is a timing diagram illustrating an example of an operation of a portable device, according to example embodiments of the inventive concepts.

FIG. 6 is a timing diagram illustrating an example of an operation of a portable device, according to example embodiments of the inventive concepts. For example, the timing diagram of FIG. 6 illustrates an example of an operation of the portable device 100a of FIG. 5. The first signal SIG1 in FIG. 6 is assumed to be an active high signal, and descriptions regarding FIG. 6 will be made with reference to FIG. 5.

At time t61, the first signal SIG1 may be activated. For example, the modem 120a may activate the first signal SIG1 before transmitting a packet to a charger (for example, 200 of FIG. 1). In response to the activated first signal SIG1, the switch controller 142a may turn off the first switch SW1a and may maintain the second switch SW2a in an ON state. Accordingly, the supply of the first power may be cut off, and the second power from the battery 180a may be supplied to the electrical load 160a.

Between time t62 and time t63, transmission TX in power line communication may occur. For example, between the time t62 and the time t63, the modem 120a may output a signal to the first terminal T11, based on current modulation. As shown in FIG. 6, between the time t62 and the time t63, the first signal SIG1 may be maintained activated and the first switch SW1a may be maintained in an OFF state. Accordingly, the transmission TX may not be affected by noise that may be generated by the electrical load 160a.

At time t64, the first signal SIG1 may be deactivated. For example, the modem 120a may deactivate the first signal SIG1 after the transmission TX is completed. In response to the deactivated first signal SIG1, the switch controller 142a may turn on the first switch SW1a and may maintain the second switch SW2a in an ON state. Accordingly, the first power may be supplied again to the electrical load 160a and the battery 180a.

As shown in FIG. 6, a period in which the first signal SIG1 is activated, that is, a first period $P_1$, may include a period in which the transmission TX occurs, that is, a transmission period PTA. In addition, in the first period $P_1$, a period before the transmission period $P_{TX}$ may be referred to as a pre-transmission period $P_{PRE}$, and a period after the transmission period $P_{TX}$ may be referred to as a post-transmission period $P_{POST}$. In some example embodiments, the pre-transmission period $P_{PRE}$ and the post-transmission period $P_{POST}$ may be approximately equal to each other and may be longer than a maximum length of the transmission period $P_{TX}$, that is, a maximum transmission period of a packet. For example, each of the pre-transmission period $P_{PRE}$, the transmission period $P_{TX}$, and the post-transmission period $P_{POST}$ may be approximately tens of milliseconds.

Figure 7:
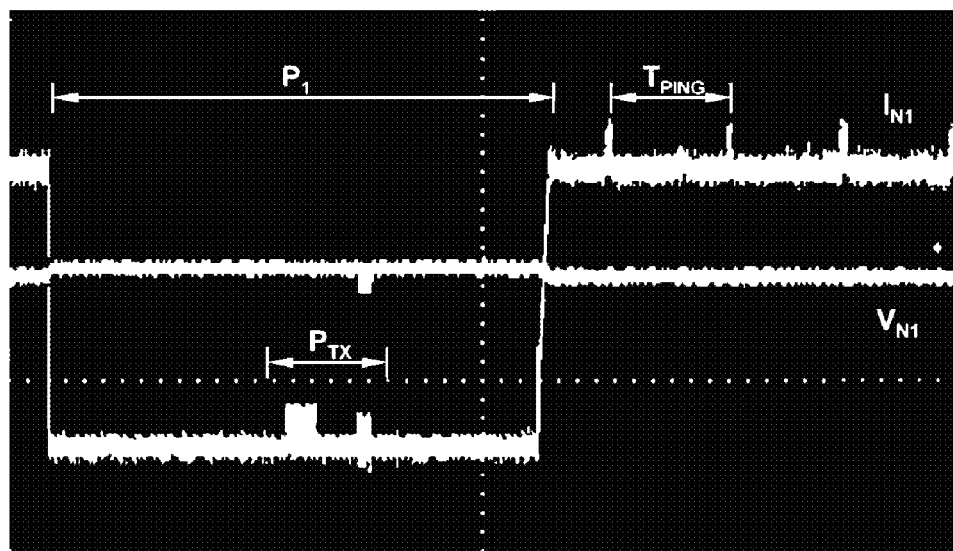
FIG. 7 illustrates an example of power line communication performed by a portable device, according to example embodiments of the inventive concepts.

FIG. 7 illustrates an example of power line communication performed by a portable device, according to example embodiments of the inventive concepts. For example, FIG. 7 illustrates waveforms of the voltage $V_{N1}$ and the current $I_{N1}$ of the first node N1 of FIG. 5. Hereinafter, descriptions regarding FIG. 7 will be made with reference to FIG. 5.

In periods except for the first period $P_1$, similarly to the descriptions made with reference to FIG. 4, the current $I_{N1}$ of the first node N1 may increase on every cycle $T_{PING}$. However, in the first period $P_1$, a reduction in the current $I_{N1}$ of the first node N1 due to wireless communication periodically performed may not occur, and power line communication may be more accurately performed during the transmission period $P_{TX}$. An increased level of the voltage $V_{N1}$ of the first node N1 and a decreased level of the current $I_{N1}$ of the first node N1, during the first period $P_1$ of FIG. 7, may result from removal of consumption of the first power by the electrical load 160a during the first period $P_1$.

Figure 8:
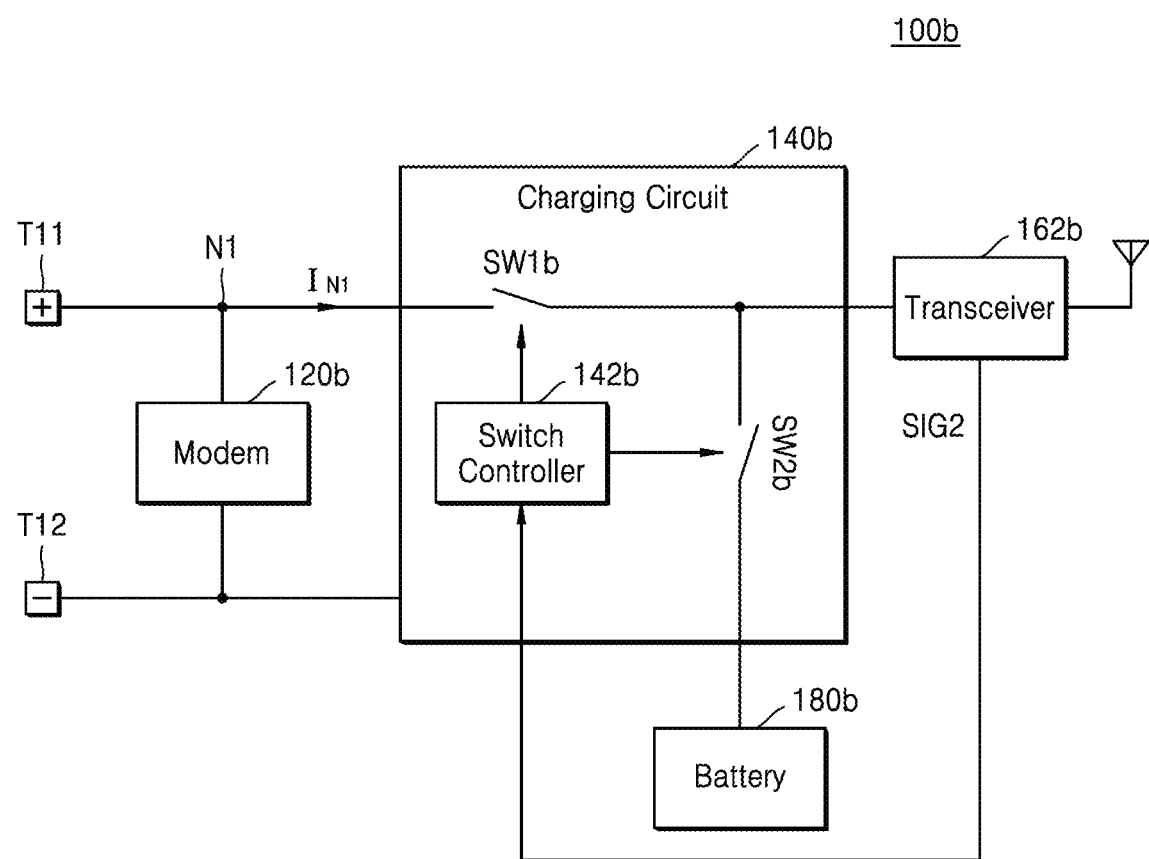
FIG. 8 is a block diagram illustrating a portable device according to example embodiments of the inventive concepts.

FIG. 8 is a block diagram illustrating a portable device 100b according to example embodiments of the inventive concepts. Similarly to the portable device 100 of FIG. 1, the portable device 100b of FIG. 8 may include a modem 120b, a charging circuit 140b, a transceiver 162b as an electrical load, and/or a battery 180b and may include the first terminal T11 and the second terminal T12. In addition, similarly to the charging circuit 140a of FIG. 5, the charging circuit 140b of FIG. 8 may include a first switch SW1b, a second switch SW2b, and a switch controller 142b. In the following descriptions regarding FIG. 8, repeated descriptions given above with reference to the figures are omitted.

The transceiver 162b may generate a second signal SIG2 activated during a period (which may be referred to as a second period) including a period in which wireless communication occurs. The switch controller 142b may receive the second signal SIG2 from the transceiver 162b and may identify the second period based on the activated second signal SIG2. The switch controller 142b may turn off the first switch SW1b and turn on the second switch SW2b, during the second period. Accordingly, the electrical load, that is, the transceiver 162b, may perform the wireless communication based on the second power instead of the first power, and the first node N1 may be free from noise caused by the wireless communication of the transceiver 162b.

Figure 9:
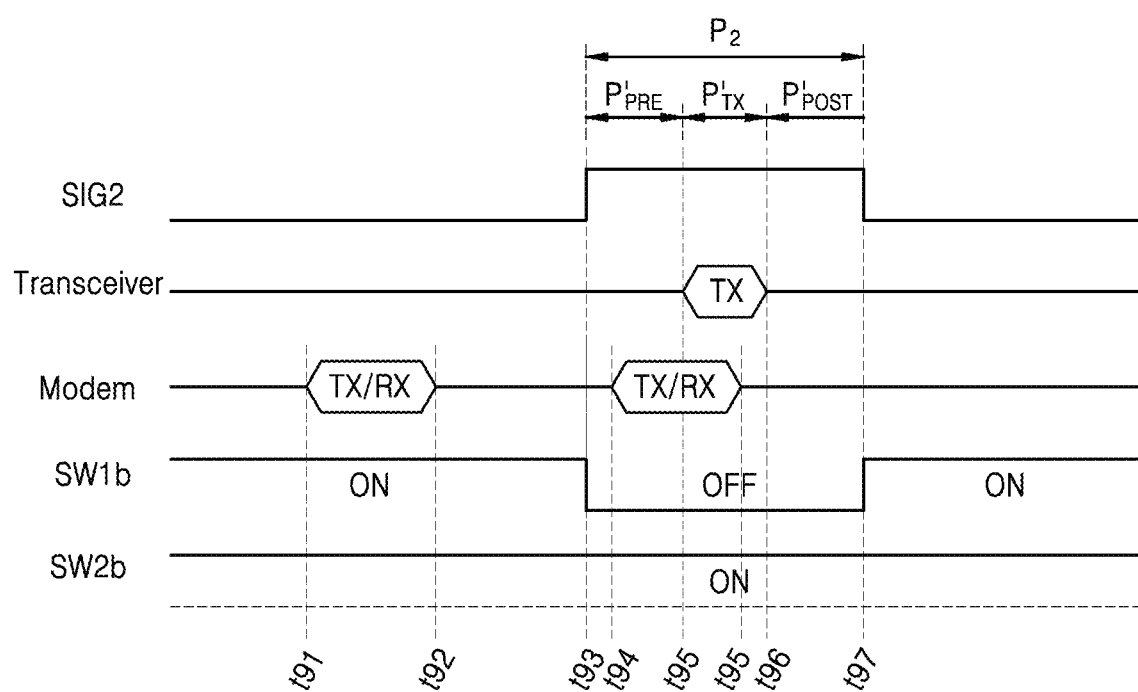
FIG. 9 is a timing diagram illustrating an example of an operation of a portable device, according to example embodiments of the inventive concepts.

FIG. 9 is a timing diagram illustrating an example of an operation of a portable device, according to example embodiments of the inventive concepts. For example, the timing diagram of FIG. 9 illustrates an example of an operation of the portable device 100b of FIG. 8. The second signal SIG2 is assumed to be an active high signal in FIG. 9, and descriptions regarding FIG. 9 will be made with reference to FIG. 8.

Between time t91 and time t92, transmission or reception TX/RX in power line communication may occur. For example, between the time t91 and the time t92, the modem 120b may output a signal to the first terminal T11, based on current modulation, or may receive, from the first terminal T11, a signal that is based on voltage modulation. As shown in FIG. 9, between the time t91 and the time t92, wireless communication by the transceiver 160b may not occur, and thus, the transmission or reception TX/RX in the power line communication may be more accurately performed.

At time t93, the second signal SIG2 may be activated. For example, the transceiver 160b may activate the second signal SIG2 before transmitting (or receiving) a signal via an antenna. In response to the activated second signal SIG2, the switch controller 142b may turn off the first switch SW1b and maintain the second switch SW2b in an ON state. Accordingly, the supply of the first power may be cut off, and the second power from the battery 180b may be supplied to the transceiver 160b.

At time t94, the transmission or reception TX/RX in the power line communication may be started, and at time t95, the transmission TX (or reception) by the transceiver 160b may be started. As shown in FIG. 9, the second signal SIG2 may be maintained activated from the time t93, and thus, the first switch SW1b may be maintained in an OFF state and the second switch SW2b may be maintained in an ON state. Accordingly, the transmission TX (or reception) by the transceiver 160b may be performed based on the second power, and the transmission or reception TX/RX in the power line communication may not be affected by noise that may be generated due to wireless communication. Next, at the time t95, the transmission or reception TX/RX in the power line communication may be more accurately terminated, and at time t96, the transmission TX (or reception) by the transceiver 160b may be terminated.

At time t97, the second signal SIG2 may be deactivated. For example, the transceiver 160b may deactivate the second signal SIG2 after the transmission TX (or reception) via the antenna is completed. In response to the deactivated second signal SIG2, the switch controller 142b may turn on the first switch SW1b and maintain the second switch SW2b in an ON state. Accordingly, the first power may be supplied again to the transceiver 160b and the battery 180b. As shown in FIG. 9, a period in which the second signal SIG2 is activated, that is, a second period $P_2$, may include a pre-transmission period $P'_{PRE}$, a transmission period $P'_{TX}$, and a post-transmission period $P'_{POST}$.

Figure 10:
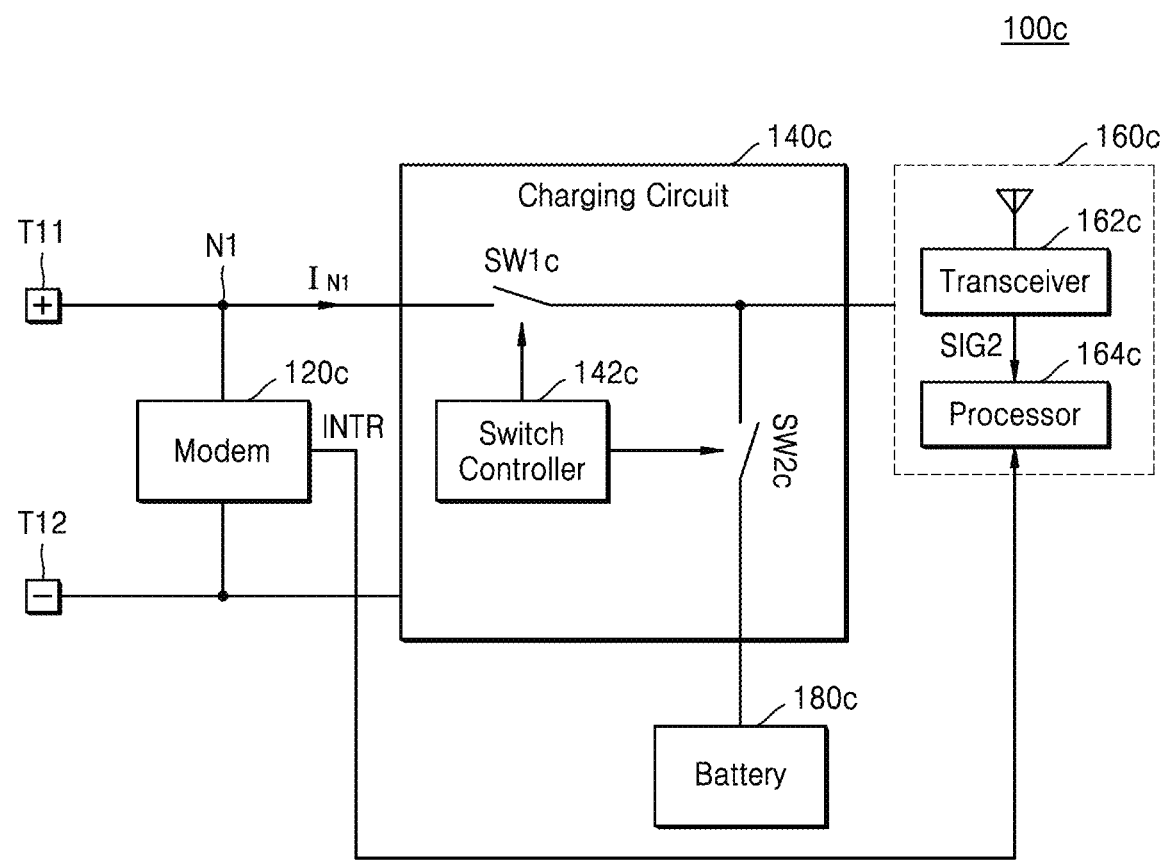
FIG. 10 is a block diagram illustrating a portable device according to example embodiments of the inventive concepts.

FIG. 10 is a block diagram illustrating a portable device 100c according to example embodiments of the inventive concepts. Similarly to the portable device 100 of FIG. 1, the portable device 100c of FIG. 10 may include a modem 120c, a charging circuit 140c, an electrical load 160c, and/or a battery 180c and may include the first terminal T11 and the second terminal T12. In addition, the charging circuit 140c may include a first switch SW1c, a second switch SW2c, and/or a switch controller 142c, and the electrical load 160c may include a transceiver 162c and/or a processor 164c. In the following descriptions regarding FIG. 10, repeated descriptions given above with reference to the figures are omitted.

Referring to FIG. 10, the modem 120c may generate an interrupt signal INTR and may provide the interrupt signal INTR to the processor 164c. For example, when reception in power line communication occurs, the modem 120c may generate the activated interrupt signal INTR. In response to the activated interrupt signal INTR, the processor 164c may obtain, from the modem 120c, data received through the power line communication. The interrupt signal INTR may also be referred to as a PLC interrupt signal.

Similarly to the transceiver 162b of FIG. 8, the transceiver 162c of FIG. 10 may generate the second signal SIG2 activated during a period including a period in which wireless communication occurs, that is, during the second period. The processor 164c may receive the second signal SIG2 and may identify the second period based on the activated second signal SIG2. During the second period, the processor 164c may ignore the activated interrupt signal INTR. Accordingly, a signal received through the power line communication in the second period may be ignored, and transmission of an acknowledgement (for example, an ACK or an NACK), in response to the reception, may not occur. Therefore, reception errors in the power line communication, which may be distorted by noise caused by the wireless communication, may be reduced or prevented. In some example embodiments, unlike the example shown in FIG. 10, the second signal SIG2 may be provided to the modem 120c instead of the processor 164c, and the modem 120c may prevent the activation of the interrupt signal INTR while the second signal SIG2 is activated.

Figure 11:
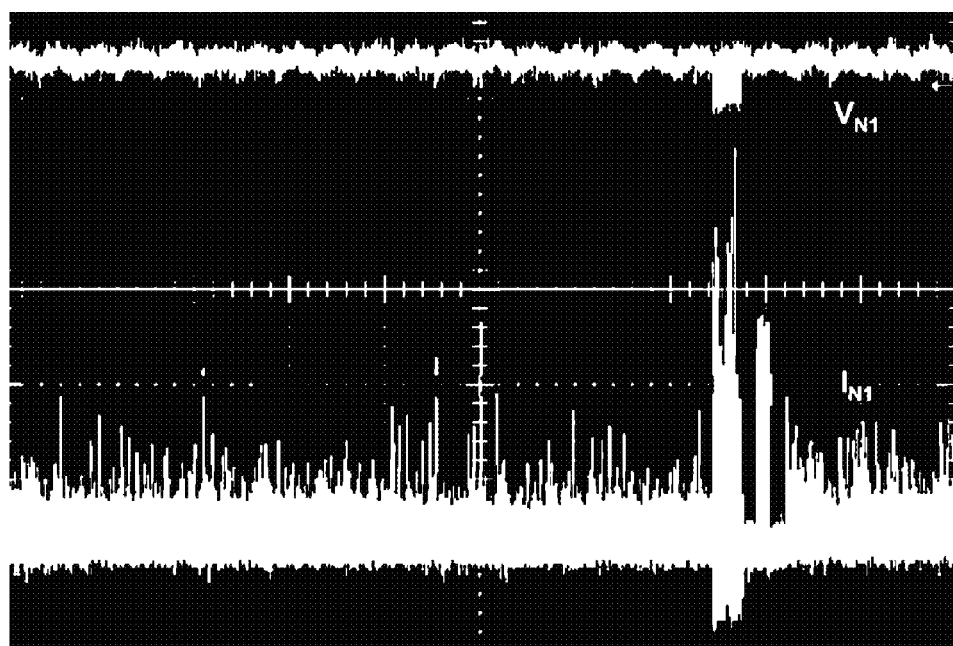
FIG. 11 illustrates an example of noise generated by a portable device, according to example embodiments of the inventive concepts.

FIG. 11 illustrates an example of noise generated by a portable device, according to example embodiments of the inventive concepts. For example, FIG. 11 illustrates examples of waveforms of the voltage $V_{N1}$ and the current $I_{N1}$ of the first node N1 of FIG. 1. Hereinafter, descriptions regarding FIG. 11 will be made with reference to FIG. 1.

After the portable device 100 is connected to the charger 200, noise may be generated. For example, at a time point at which the portable device 100 is connected to the charger 200, noise may be generated at the first node N1, due to: movement of electric charges, which is caused by a difference between the first power of the charger 200 and the second power of the battery 180; the occurrence of consumption of the first power by the electrical load 160; a difference between time points at which the first terminal T11 and the second terminal T12 of the portable device 100 are respectively brought into contact with the first terminal T21 and the second terminal T22 of the charger 200; or the like. For example, as shown in FIG. 11, noise may be generated in the voltage $V_{N1}$ and the current $I_{N1}$ of the first node N1 directly after the portable device 100 is connected to the charger 200, and thus, the modem 120 of the portable device 100 and/or the modem 220 of the charger 200 may misidentify the noise as a packet (or a preamble) transmitted by a counterpart, and when wireless communication occurs during the power line communication between the portable device 100 and the charger 200, the packet may be distorted. As such, example embodiments, in which the power line communication is more accurately performed despite the noise generated during the connection between the portable device 100 and the charger 200, will be described below with reference to FIGS. 12A and 12B.

Figure 12A:
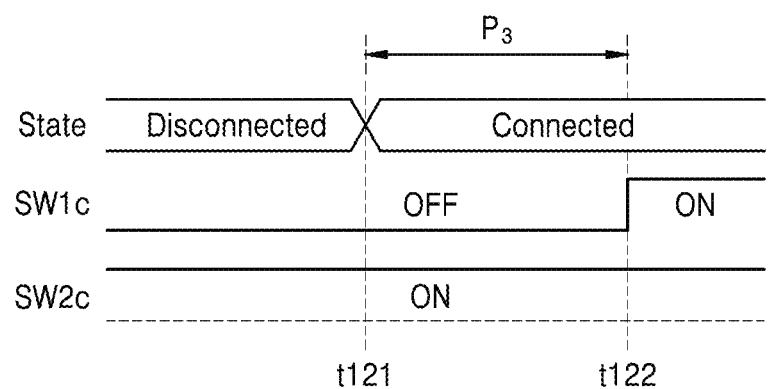
FIGS. 12A and 12B are timing diagrams illustrating examples of operations of portable devices, according to example embodiments of the inventive concepts.
Figure 12B:
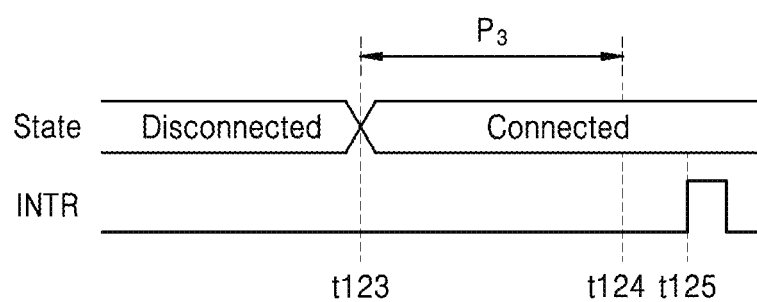

FIGS. 12A and 12B are timing diagrams illustrating examples of operations of portable devices, according to example embodiments of the inventive concepts. For example, the timing diagrams of FIGS. 12A and 12B illustrate examples of operations of allowing power line communication between a portable device and a charger to be free from noise generated directly after the portable device is connected to the charger. In some example embodiments, the operations of FIGS. 12A and 12B may be performed by the portable device 100c of FIG. 10, and hereinafter, descriptions regarding FIGS. 12A and 12B will be made with reference to FIG. 10.

Referring to FIG. 12A, at time t121, the portable device 100c may be connected to a charger (for example, 200 of FIG. 1), and noise may be generated as described above with reference to FIG. 11. The switch controller 142c may cut off the supply of the first power during a certain period (which may be referred to as a third period) from a time point at which the portable device 100c is connected to the charger. For example, as shown in FIG. 12A, during a third period $P_3$ from the time t121 to the time t122, the charging circuit 140c may turn off the first switch SW1c and turn on the second switch SW2c. Accordingly, noise caused by initial fluctuation of the first power may be suppressed, and the modem 120c may more accurately perform power line communication with the charger in the third period $P_3$.

Referring to FIG. 12B, at time t123, the portable device 100c may be connected to a charger (for example, 200 of FIG. 1), and noise may be generated as described above with reference to FIG. 11. The modem 120c may cut off the occurrence of an interrupt during a certain period from a time point at which the portable device 100c is connected to the charger. For example, as shown in FIG. 12B, the modem 120c may generate the deactivated interrupt signal INTR during the third period $P_3$ from the time t123 to the time t124. After the third period $P_3$ is terminated, the activated interrupt signal INTR may be generated upon reception in power line communication at time t125. Accordingly, errors in the power line communication due to the initial fluctuation of the first power may be reduced or prevented.

Figure 13:
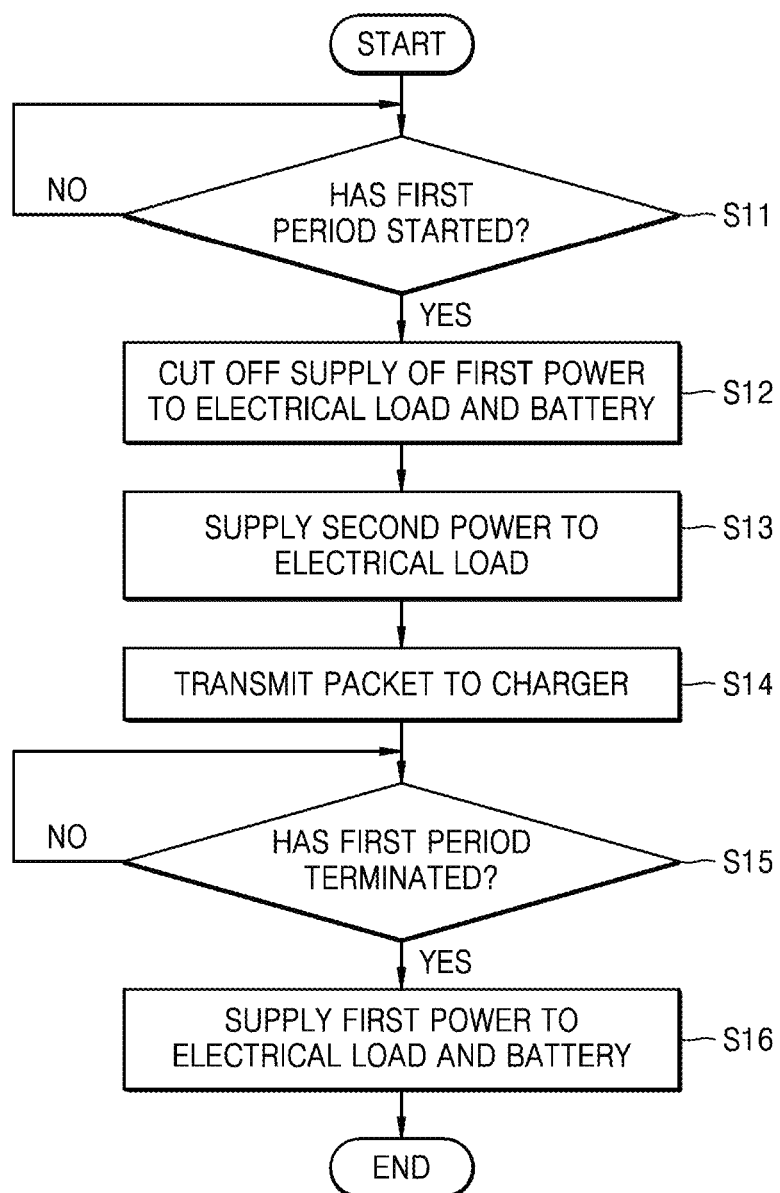
FIG. 13 is a flowchart illustrating a method of operating a portable device, according to example embodiments of the inventive concepts.

FIG. 13 is a flowchart illustrating a method of operating a portable device, according to example embodiments of the inventive concepts. As shown in FIG. 13, the method of operating the portable device may include a plurality of operations S11 to S16. In some example embodiments, the method of FIG. 13 may be performed by the portable device 100a of FIG. 5, and hereinafter, descriptions regarding FIG. 13 will be made with reference to FIG. 5.

In operation S11, it may be determined whether a first period is started. As described above with reference to FIGS. 5 and 6, the first period may include a period in which power line communication by the modem 120a occurs. For example, the modem 120a may generate the activated first signal SIG1 before transmitting a packet to a charger (for example, 200 of FIG. 1), and the first period may be started. As shown in FIG. 13, when the first period is started, operation S12 may be subsequently performed.

In operation S12, the supply of the first power to the electrical load 160a and the battery 180a may be cut off. For example, in response to the activated first signal SIG1, the switch controller 142a may turn off the first switch SW1a, and the supply of the first power provided by the charger may be cut off. Accordingly, noise caused by drastic power consumption by the electrical load 160a during the first period may not affect the power line communication.

In operation S13, the second power may be supplied to the electrical load 160a. For example, in response to the activated first signal SIG1, the switch controller 142a may turn on the second switch SW2a, and the second power provided by the battery 180a may be supplied to the electrical load 160a. Accordingly, the electrical load 160a may be operated based on the second power even though the supply of the first power is cut off.

In operation S14, a packet may be transmitted to the charger. For example, the modem 120a may transmit the packet to the charger during the first period, that is, while the first signal SIG1 is activated. The transmission of the packet may not be affected by noise caused by an operation of the electrical load 160a, and thus, the power line communication may be more accurately performed.

In operation S15, it may be determined whether the first period is terminated. For example, after the transmission of the packet to the charger is completed, the modem 120a may generate the deactivated first signal SIG1, and the first period may be terminated. As shown in FIG. 13, after the first period is terminated, operation S16 may be subsequently performed.

In operation S16, the first power may be supplied to the electrical load 160a and the battery 180a. For example, in response to the deactivated first signal SIG1, the switch controller 142a may turn on the first switch SW1a and the second switch SW2a, and thus, the first power provided by the charger may be supplied to the electrical load 160a and the battery 180a.

Figure 14A:
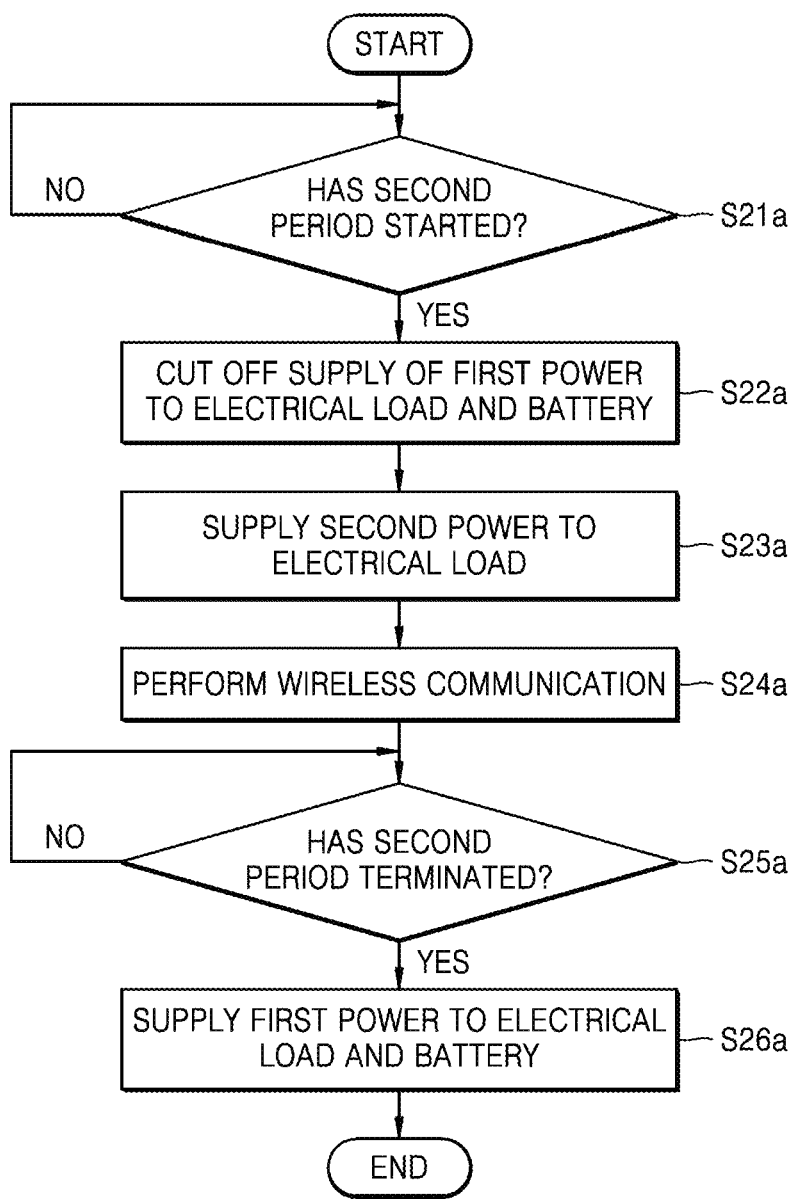
FIGS. 14A and 14B are flowcharts illustrating examples of methods of operating portable devices, according to example embodiments of the inventive concepts.
Figure 14B:
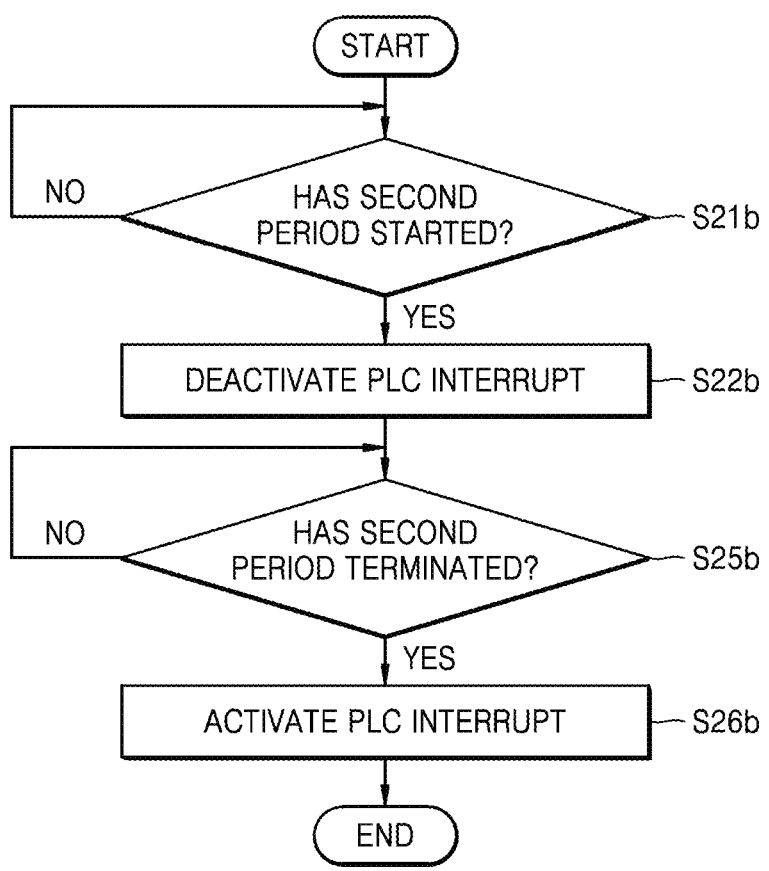

FIGS. 14A and 14B are flowcharts illustrating examples of methods of operating portable devices, according to example embodiments of the inventive concepts. In some example embodiments, the method of FIG. 14A may be performed by the portable device 100b of FIG. 8, and the method of FIG. 14B may be performed by the portable device 100c of FIG. 10. Hereinafter, descriptions regarding FIG. 14A will be made with reference to FIG. 8, and descriptions regarding FIG. 14B will be made with reference to FIG. 10.

Referring to FIG. 14A, the method of operating the portable device may include a plurality of operations S21a to S26a. In operation S21a, it may be determined whether a second period is started. As described above with reference to FIGS. 8 and 9, the second period may include a period in which wireless communication by the transceiver 162b occurs. For example, the transceiver 162b may generate the activated second signal SIG2 before transmitting a signal via the antenna, and the second period may be started. As shown in FIG. 14A, when the second period is started, operation S22a may be subsequently performed.

In operation S22a, the supply of the first power to an electrical load and the battery 180b may be cut off. For example, in response to the activated second signal SIG2, the switch controller 142b may turn off the first switch SW1b, and the supply of the first power provided by a charger may be cut off. Accordingly, noise caused by drastic power consumption by the electrical load, for example, the transceiver 162b, during the second period may not affect the power line communication.

In operation S23a, the second power may be supplied to the electrical load. For example, in response to the activated second signal SIG2, the switch controller 142b may turn on the second switch SW2b, and the second power provided by the battery 180b may be supplied to the electrical load, for example, the transceiver 162b. Accordingly, the electrical load including the transceiver 162b may be operated based on the second power even though the supply of the first power has been cut off.

In operation S24a, the wireless communication may be performed. For example, the transceiver 162b may process a signal received via the antenna and may output a signal to be transmitted via the antenna. When the power line communication occurs in the second period, the power line communication may not be affected by noise caused by an operation of the transceiver 162b, and thus, the power line communication may be more accurately performed.

In operation S25a, it may be determined whether the second period is terminated. For example, after the reception of the signal via the antenna is completed, the transceiver 162b may generate the deactivated second signal SIG2, and the second period may be terminated. As shown in FIG. 14A, when the second period is terminated, operation S26a may be subsequently performed.

In operation S26a, the first power may be supplied to the electrical load and the battery 180b. For example, in response to the deactivated second signal SIG2, the switch controller 142b may turn on the first switch SW1a and the second switch SW2a, and thus, the first power provided by the charger may be supplied to the electrical load, for example, the transceiver 162b, and to the battery 180a.

Referring to FIG. 14B, the method of operating the portable device may include a plurality of operations S21b, S22b, S25b, and S26b. In operation S21b, it may be determined whether a second period is started. As described above with reference to FIG. 10, the second period may include a period in which wireless communication by the transceiver 162c occurs. For example, the transceiver 162c may generate the activated second signal SIG2 before transmitting a signal via the antenna, and the second period may be started. As shown in FIG. 14B, when the second period is started, operation S22b may be subsequently performed.

In operation S22b, a PLC interrupt may be deactivated. For example, the processor 164c may receive the second signal SIG2 from the transceiver 162c and may receive the interrupt signal (or PLC interrupt signal) INTR from the modem 120c. In response to the activated second signal SIG2, the processor 164c may ignore the interrupt signal INTR. Accordingly, a signal received through power line communication in the second period may be ignored, and reception errors in the power line communication, which may be distorted by noise caused by the wireless communication, may be reduced or prevented.

In operation S25b, it may be determined whether the second period is terminated. For example, after the transmission of the signal via the antenna is completed, the transceiver 162b may generate the deactivated second signal SIG2, and the second period may be terminated. As shown in FIG. 14B, when the second period is terminated, operation S26b may be subsequently performed.

In operation S26b, the PLC interrupt may be activated. For example, in response to the deactivated second signal SIG2, the processor 164c may process the interrupt signal INTR, and when the activated interrupt signal INTR is received, the processor 164c may obtain data, which is received through the power line communication, from the modem 120c.

Figure 15A:
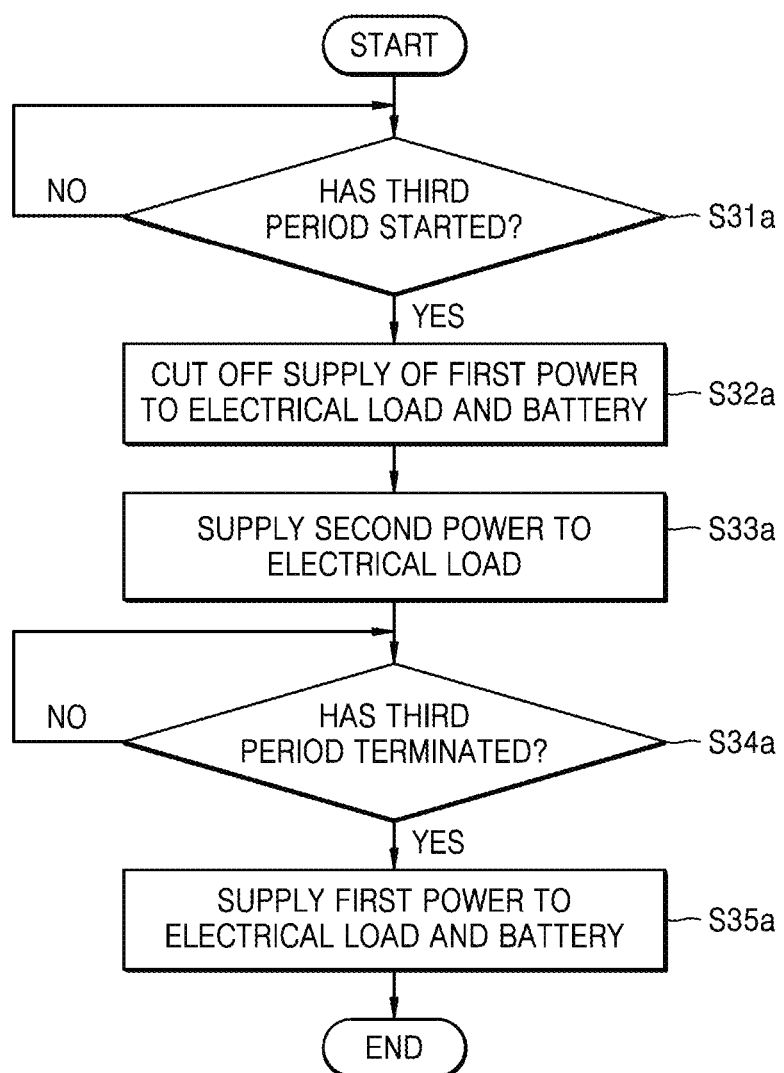
FIGS. 15A and 15B are flowcharts illustrating examples of methods of operating portable devices, according to example embodiments of the inventive concepts.
Figure 15B:
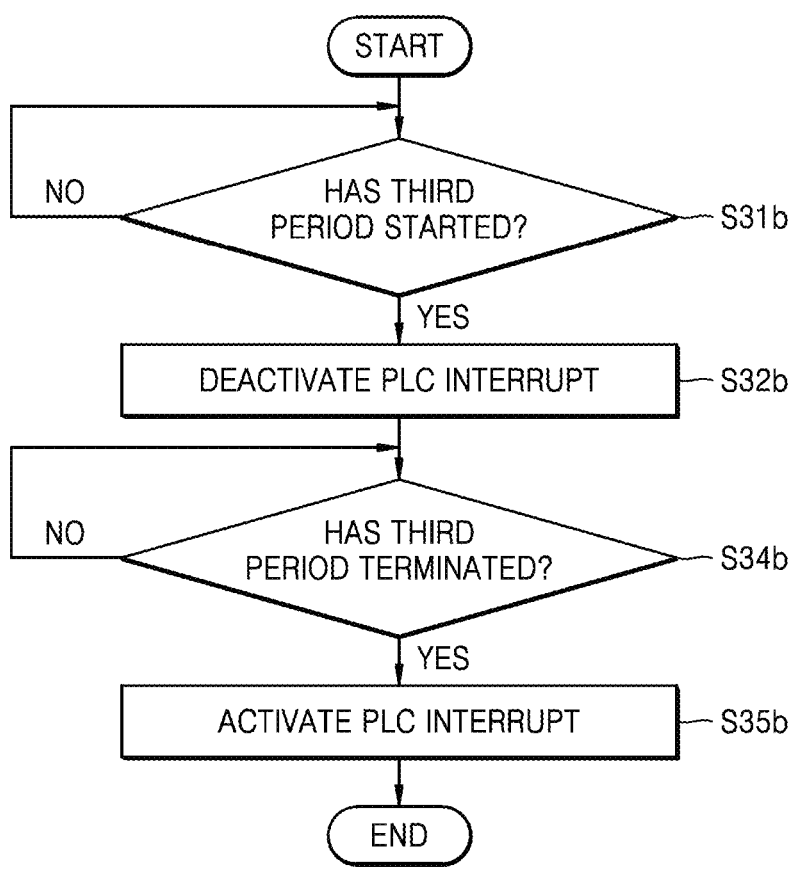

FIGS. 15A and 15B are flowcharts illustrating examples of methods of operating portable devices, according to example embodiments of the inventive concepts. In some example embodiments, the methods of FIGS. 15A and 15B may be performed by the portable device 100c of FIG. 10, and hereinafter, descriptions regarding FIGS. 15A and 15B will be made with reference to FIG. 10.

Referring to FIG. 15A, the method of operating the portable device may include a plurality of operations S31a to S35a. In operation S31a, it may be determined whether a third period is started. As described above with reference to FIGS. 12A and 12B, the third period may be started at a time point at which the portable device 100c is connected to a charger. In some example embodiments, the switch controller 142c may determine, by itself or based on a signal provided by another component of the portable device 100c, whether the portable device 100c is connected to the charger. As shown in FIG. 15A, when the third period is started because the portable device 100c is connected to the charger, operation S32a may be subsequently performed.

In operation S32a, the supply of the first power to the electrical load 160c and the battery 180c may be cut off. For example, directly after the portable device 100c is connected to the charger, the switch controller 142c may turn off the first switch SW1c, and the supply of the first power provided by the charger may be cut off. Accordingly, noise caused by the initial fluctuation of the first power may be suppressed, and the modem 120c may more accurately perform power line communication with the charger in the third period.

In operation S33a, the second power may be supplied to the electrical load 160c. For example, the switch controller 142c may turn on the second switch SW2c, and the second power provided by the battery 180c may be supplied to the electrical load 160c. Accordingly, the electrical load 160c may be operated based on the second power even though the supply of the first power is cut off.

In operation S34a, it may be determined whether the third period is terminated. For example, the switch controller 142c may determine, based on an output from a timer, whether the third period is terminated. As shown in FIG. 15A, when the third period is terminated, operation S35a may be subsequently performed.

In operation S35a, the first power may be supplied to the electrical load 160c and the battery 180c. For example, when the third period is terminated, the switch controller 142c may turn on the first switch SW1c and the second switch SW2c, and thus, the first power provided by the charger may be supplied to the electrical load 160c and the battery 180c.

Referring to FIG. 15B, the method of operating the portable device may include a plurality of operations S31b, S32b, S34b, and S35b. In operation S31b, it may be determined whether a third period is started. In some example embodiments, the modem 120c may determine, by itself or based on a signal provided by another component of the portable device 100c, whether the portable device 100c is connected to a charger. As shown in FIG. 15B, when the third period is started because the portable device 100c is connected to the charger, operation S32b may be subsequently performed.

In operation S32b, a PLC interrupt may be deactivated. For example, the modem 120c may not activate the interrupt signal INTR, despite voltage and/or current fluctuations occurring at the first terminal T11 and/or the second terminal T12. Accordingly, errors in power line communication due to the initial fluctuation of the first power may be reduced or prevented.

In operation S34b, it may be determined whether the third period is terminated. For example, the modem 120c may determine, based on an output from a timer, whether the third period is terminated. As shown in FIG. 15B, when the third period is terminated, operation S35b may be subsequently performed.

In operation S35b, the PLC interrupt may be activated. For example, when a packet is received through the power line communication upon the termination of the third period, the modem 120c may activate the interrupt signal INTR.

Figure 16:
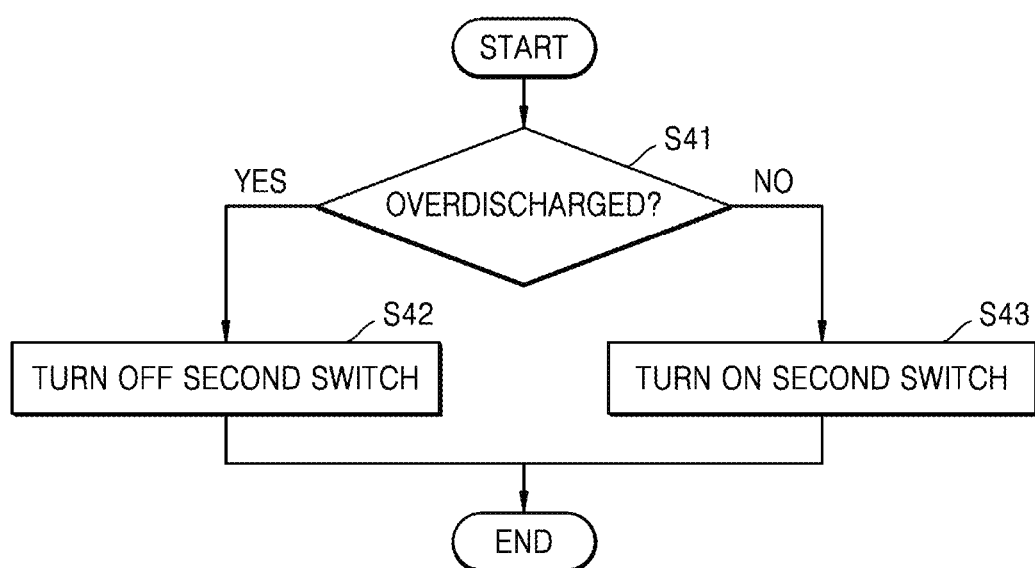
FIG. 16 is a flowchart illustrating a method of operating a portable device, according to example embodiments of the inventive concepts.

FIG. 16 is a flowchart illustrating a method of operating a portable device, according to example embodiments of the inventive concepts. As shown in FIG. 16, the method of operating the portable device may include a plurality of operations S41 to S43. In some example embodiments, the method of FIG. 16 may be performed by the portable device 100a of FIG. 5, and hereinafter, descriptions regarding FIG. 16 will be made with reference to FIG. 5.

In the examples described above with reference to the figures, the second switch SW2a connected between the electrical load 160a and the battery 180a may be maintained in an ON state by the switch controller 142a. However, the switch controller 142a may cut off the supply of the second power, which is output from the battery 180a, by turning off the second switch SW2a based on a state of the battery 180a.

Referring to FIG. 16, in operation S41, it may be determined whether the battery 180a is overdischarged. For example, the switch controller 142a may determine whether the battery 180a is overdischarged, based on an output voltage, an output current, an output quantity of electric charge, and/or the like of the battery 180a. The battery 180a may be damaged or have a reduced lifespan when the battery 180a is maintained overdischarged, and to prevent this, the switch controller 142a may monitor the state of the battery 180a. As shown in FIG. 16, when it is determined that the battery 180a is overdischarged, operation S42 may be subsequently performed, and when it is determined that the battery 180a is not overdischarged, operation S43 may be subsequently performed.

In operation S42, the second switch SW2a may be turned off. For example, when the battery 180a is discharged, the switch controller 142a may cut off discharging by turning off the second switch SW2a. On the other hand, in operation S43, the second switch SW2a may be turned on. For example, when the battery 180a is not overdischarged, the switch controller 142a may cause the battery 180a to be charged or to provide the second power to the electrical load 160a, by turning on the second switch SW2a.

In some example embodiments, in operation S41, it may be determined whether the battery 180a is fully charged. For example, the switch controller 142a may determine whether the battery 180a is fully charged, based on the output voltage, the output current, the output quantity of electric charge, and/or the like of the battery 180a. Charging occurring in a fully-charged state, that is, overcharging, may damage the battery 180a or reduce the lifespan of the battery 180a, and to prevent this, the switch controller 142a may monitor the state of the battery 180a. When it is determined that the battery 180a is fully charged, operation S42 may be subsequently performed, and when it is determined that the battery 180a is not fully charged, operation S43 may be subsequently performed.

Figure 17:
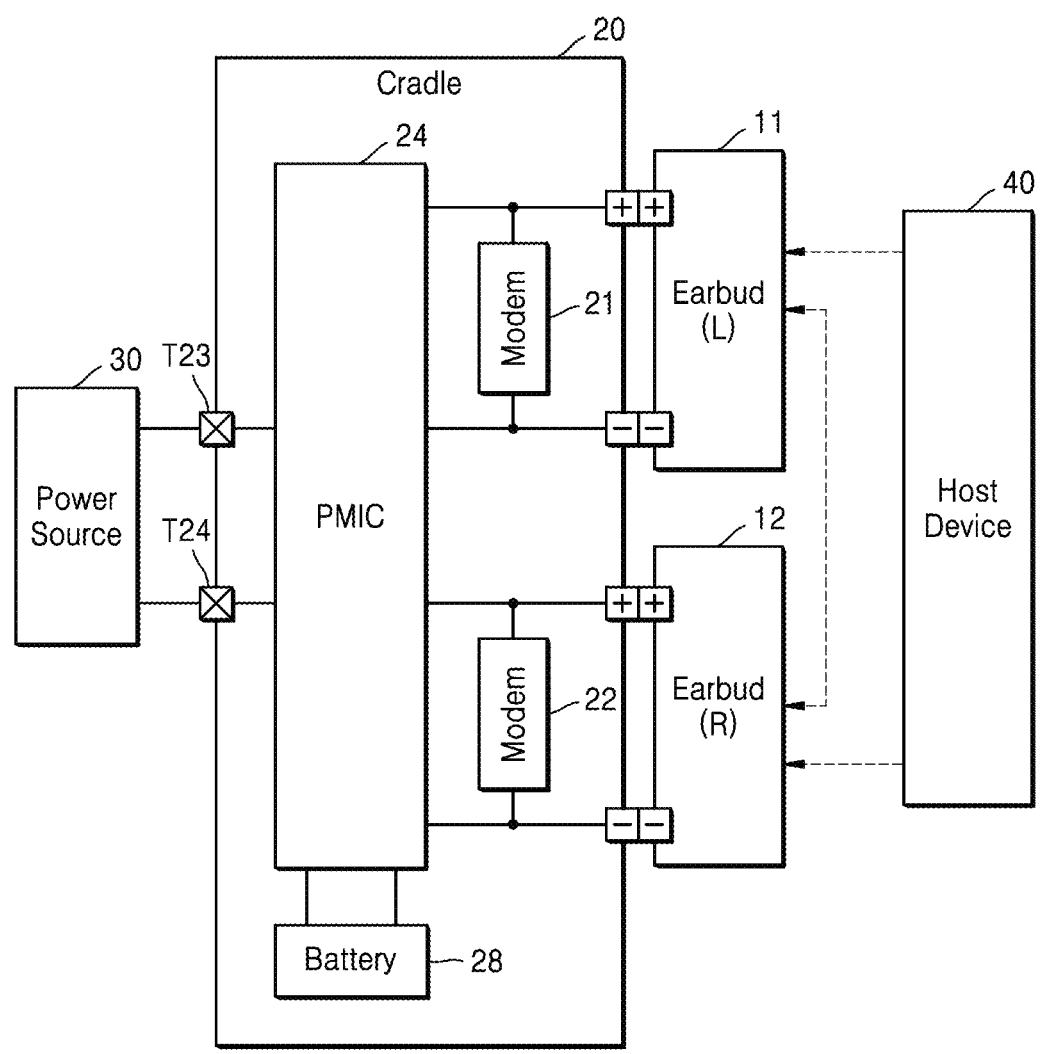
FIG. 17 is a block diagram illustrating a portable device according to example embodiments of the inventive concepts.

FIG. 17 is a block diagram illustrating a portable device according to example embodiments of the inventive concepts. For example, the block diagram of FIG. 17 illustrates first and second earbuds 11 and 12 as a portable device and also illustrates a cradle 20 connected to the first and second earbuds 11 and 12, a power source 30 connected to the cradle 20, and/or a host device 40 performing wireless communication with the first and second earbuds 11 and 12. In the following descriptions regarding FIG. 17, repeated descriptions given with reference to FIG. 1 are omitted.

The first and second earbuds 11 and 12 may perform the wireless communication with the host device 40 and may output sound from a source signal received from the host device 40. The host device 40 may be any device providing the source signal to the first and second earbuds 11 and 12 through the wireless communication. For example, the host device 40 may include a portable device such as a smart phone, a tablet PC, or a laptop PC, or a stationary device such as a television (TV), a multimedia player, or a desktop PC. In addition, the first and second earbuds 11 and 12 may perform the wireless communication with each other. For example, the first and second earbuds 11 and 12 may perform the wireless communication with each other for the purpose of synchronization, status delivery, or the like. Each of the first and second earbuds 11 and 12 may include a battery that is charged from power supplied by the cradle 20, and as described above with reference to the figures, each of the first and second earbuds 11 and 12 may more efficiently and/or/or more accurately perform power line communication with the cradle 20. Accordingly, additional terminals for communication with the cradle 20 except for a pair of terminals for charging may be omitted from the first and second earbuds 11 and 12, and the first and second earbuds 11 and 12 and the cradle 20 may have simple structures. In particular, due to small sizes required for the first and second earbuds 11 and 12 and the cradle 20, the simple structures of the first and second earbuds 11 and 12 and the cradle 20 may provide various advantages.

The cradle 20 may function as a charger of the first and second earbuds 11 and 12 and may be portable. For example, the cradle 20 may include a battery 28 and may charge the first and second earbuds 11 and 12 from power provided by the battery 28. In addition, the cradle 20 may include a third terminal T23 and a fourth terminal T24 for connection to a power source 30 and may charge the battery 28 and the first and second earbuds 11 and 12 from power provided by the power source 30. In some example embodiments, the cradle 20 may function as a case of the first and second earbuds 11 and 12. For example, the cradle 20 may have an internal structure, to which the first and second earbuds 11 and 12 are allowed to be mounted, and may include a cover covering the first and second earbuds 11 and 12. As shown in FIG. 17, the cradle 20 may include a first modem 21, a second modem 22, a PMIC 24, and/or the battery 28.

The PMIC 24 may generate the power, which is supplied to the first and second earbuds 11 and 12, from the power provided by the power source 30 and/or the battery 28. In some example embodiments, the power source 30 may provide a 5 V DC voltage based on a universal serial bus (USB) interface, and the PMIC 24 may generate, from the 5 V DC voltage, a voltage and/or a current for charging the battery 28 and a voltage and/or a current for charging the first and second earbuds 11 and 12. The first modem 21 may perform the power line communication with the first earbud 11, and the second modem 22 may perform the power line communication with the second earbud 12.

Figure 18:
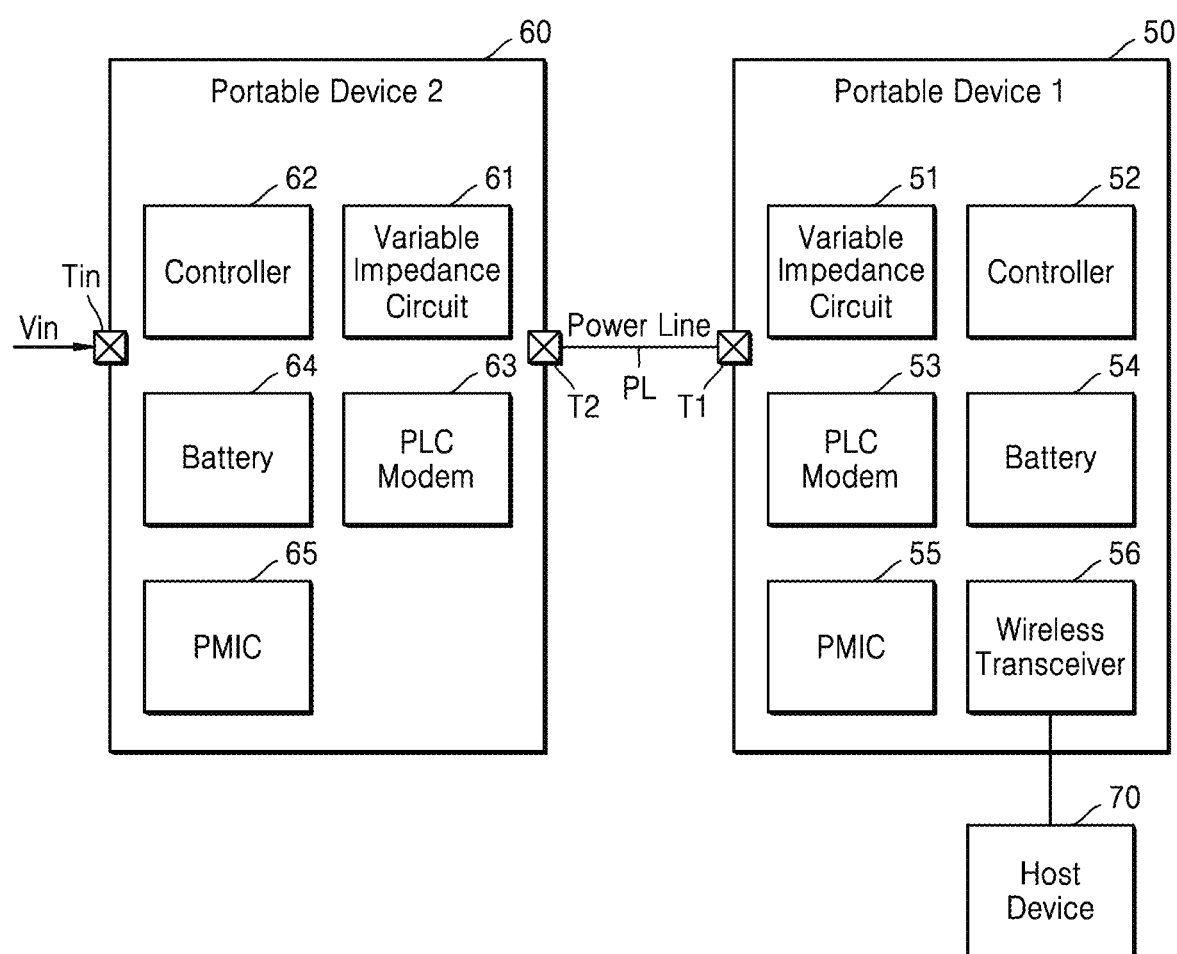
FIG. 18 is a block diagram illustrating a portable device according to example embodiments of the inventive concepts.

FIG. 18 is a block diagram illustrating a portable device according to example embodiments of the inventive concepts. Referring to FIG. 18, first and second portable devices 50 and 60 may respectively correspond to the portable device 100 and the charger 200 in FIG. 1.

The first portable device 50 may include a first terminal T1, a variable impedance circuit 51, a controller 52, a PLC modem 53, a battery 54, a PMIC 55, and/or a wireless transceiver 56. In some example embodiments, the variable impedance circuit 51, the controller 52, the PLC modem 53, the battery 54, the PMIC 55, and/or the wireless transceiver 56 may be mounted on a printed circuit board. The PMIC 55 may manage power of the battery 54. In some example embodiments, the charging circuit 140 of FIG. 1 may be implemented as a portion of the PMIC 55. In some example embodiments, the first portable device 50 may further include a charger and a charging integrated circuit (IC).

The wireless transceiver 56 may perform wireless communication with a host device 70. For example, the wireless transceiver 56 may include a Bluetooth module and may receive data from the host device 70. For example, non-limiting examples of the host device 70 may include a smart phone, a tablet PC, a PC, a smart TV, a mobile phone, a personal digital assistant (PDA), a laptop, a media player, a microserver, a global positioning system (GPS) device, an electronic-book (e-book) reader, a digital broadcasting terminal, a navigation system, a kiosk, an MP3 player, a digital camera, and other mobile or non-mobile computing devices. In addition, the host device 70 may include a wearable device such as a watch, glasses, a hair band, or a ring, which has a communication function and a data processing function. In some example embodiments, the wireless transceiver 56 of the first portable device 50 may provide the data, which is received from the host device 70, to the second portable device 60 through power line communication.

The second portable device 60 may include a second terminal T2, an input terminal Tin, a variable impedance circuit 61, a controller 62, a PLC modem 63, a battery 64, and/or a PMIC 65. In some example embodiments, the variable impedance circuit 61, the controller 62, the PLC modem 63, the battery 64, and/or the PMIC 65 may be mounted on a printed circuit board. The PMIC 65 may manage power of the battery 64. In some example embodiments, the PMIC 65 may correspond to the PMIC 240 of FIG. 1. In some example embodiments, the second portable device 60 may further include a converter that converts an input voltage Vin received via the input terminal Tin.

Figure 19:
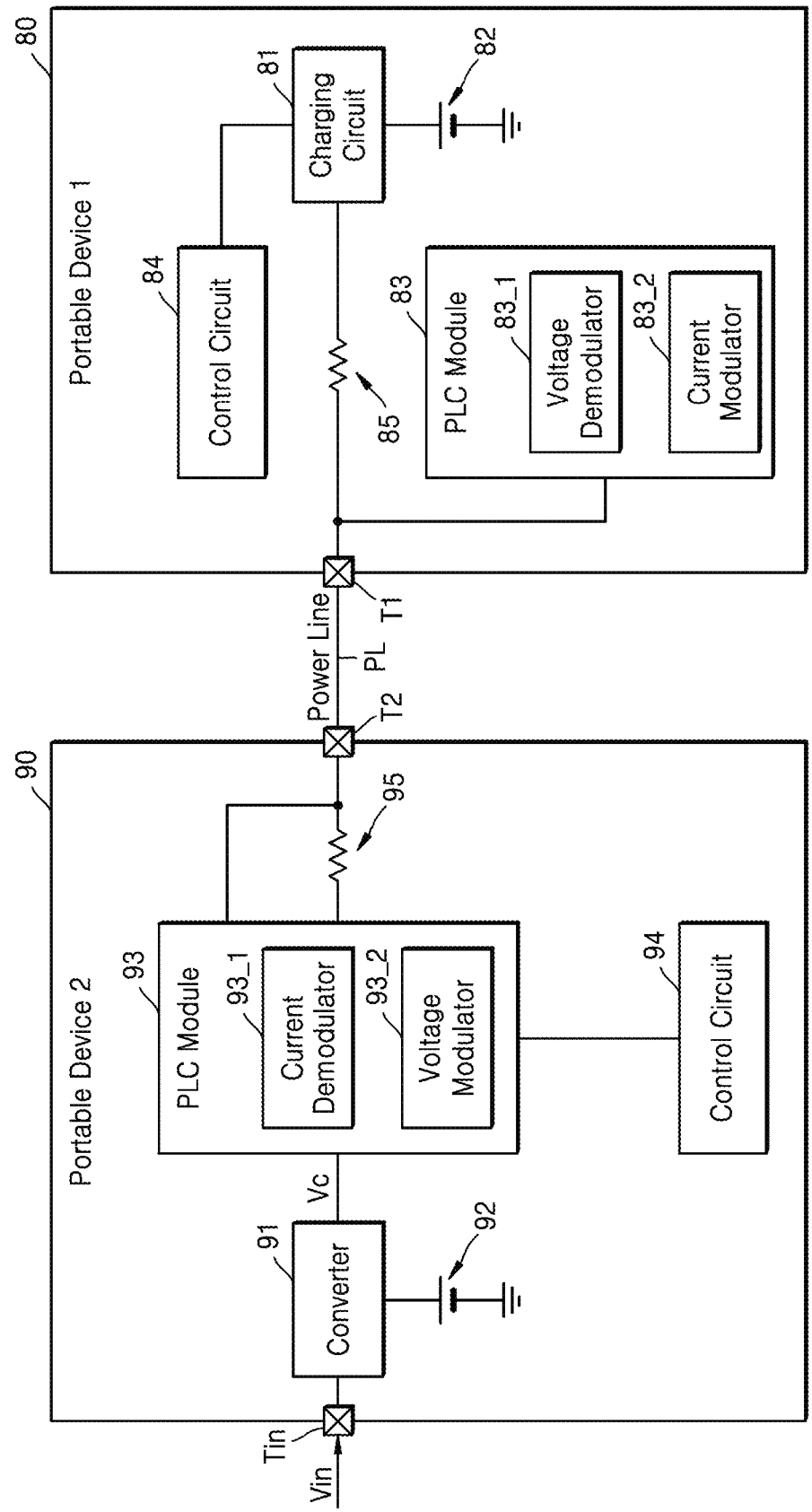
FIG. 19 is a block diagram illustrating a portable device according to example embodiments of the inventive concepts.

FIG. 19 is a block diagram illustrating a portable device according to example embodiments of the inventive concepts. Referring to FIG. 19, first and second portable devices 80 and 90 may respectively correspond to the portable device 100 and the charger 200 in FIG. 1.

The first portable device 80 may include the first terminal T1, an impedance circuit 85, a control circuit 84, a PLC module 83, a battery 82, and/or a charging circuit 81. In some example embodiments, the charging circuit 81 may include a linear charger and may be implemented by a charging IC. The control circuit 84 may enable the charging circuit 81 in a charging period and may charge the battery 82 based on power received via a power line PL. In addition, the control circuit 84 may disable the charging circuit 81 in a data reception period, and the first portable device 80 may be operated based on power of the battery 82. In some example embodiments, the battery 82 may be charged based on power received in a data transmission period.

The second portable device 90 may include the second terminal T2, the input terminal Tin, a converter 91, a battery 92, a PLC module 93, a control circuit 94, and/or an impedance circuit 95. The converter 91 may generate a voltage Vc converted from the input voltage Vin received via the input terminal Tin or a voltage of the battery 92. In some example embodiments, the converter 91 may include a switching regulator and may include, as a DC-DC converter, a boost converter and/or a buck converter, or a buck-boost converter. In addition, the converter 91 may charge the battery 92 based on the input voltage Vin.

The PLC module 83 of the first portable device 80 may include a voltage demodulator 83_1 and/or a current modulator 83_2 and, in some example embodiments, may further include a current source. The current modulator 83_2 may perform current modulation under the control of the control circuit 84. The current source may generate a modulated current signal (for example, a current pulse), and the current signal may be output via the first terminal T1. The voltage demodulator 83_1 may demodulate a voltage signal received via the first terminal T1 and may provide the demodulated signal to the control circuit 84.

The PLC module 93 of the second portable device 90 may include a current demodulator 93_1 and/or a voltage modulator 93_2. The control circuit 94 may control the current demodulator 93_1 and the voltage modulator 93_2. The voltage modulator 93_2 may generate a modulated voltage signal according to the control by the control circuit 94, and the voltage signal may be output via the second terminal T2. In some example embodiments, the voltage modulator 93_2 may include a linear regulator, for example, a low-dropout (LDO) regulator. The current demodulator 93_1 may demodulate a current signal received via the second terminal T2 and may provide the demodulated signal to the control circuit 94.

Figure 20:
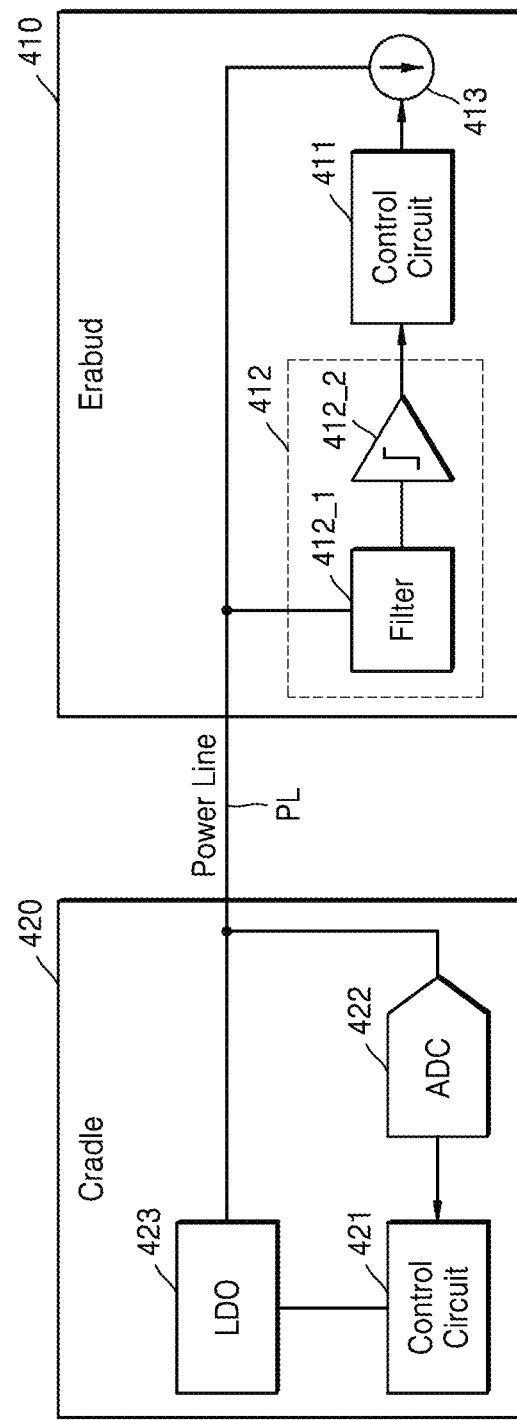
FIG. 20 is a block diagram illustrating a portable device according to example embodiments of the inventive concepts.

FIG. 20 is a block diagram illustrating a portable device according to example embodiments of the inventive concepts. Referring to FIG. 20, an earbud 410 and a cradle 420 may respectively correspond to the portable device 100 and the charger 200 in FIG. 1.

The earbud 410 may include a control circuit 411, a voltage demodulator 412, and/or a current modulator 413, and the voltage demodulator 412 may include a filter 412_1 and/or an amplifier 412_2. The cradle 420 may include a control circuit 421, an analog-to-digital converter (ADC) 422, and/or an LDO regulator 423, the ADC 422 may perform current demodulation, and the LDO regulator 423 may perform voltage modulation.

In the first portable device 410, the filter 412_1 of the voltage demodulator 412 may remove noise by cutting off a particular frequency component of a voltage signal received via the power line PL and may provide the filtered voltage signal to the amplifier 412_2. The amplifier 412_2 may generate a signal having a logic high level or a logic low level by amplifying a voltage signal and thus provide the signal to the control circuit 411. The control circuit 411 may identify information transmitted by the cradle 420, based on a signal received from the amplifier 412_2, and to transfer information to the cradle 420, may generate a modulated current signal, which is transmitted via the power line PL, by controlling the current modulator 413.

In the cradle 420, the ADC 422 may generate a digital signal from a current signal received via the power line PL and thus provide the digital signal to the control circuit 421. The control circuit 421 may identify the information transmitted by the earbud 410, based on the digital signal. In addition, the control circuit 421 may generate a modulated voltage signal, which is transmitted via the power line PL, by controlling the LDO regulator 423.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A method of operating a portable device, which performs power line communication with a charger external thereto, the method comprising:
   during a first period comprising a period in which the power line communication occurs, cutting off supply of first power, which is provided by the charger, to an electrical load and supplying second power from a battery to the electrical load;
   when the first period is terminated, from the first power, charging the battery and supplying power to the electrical load; and
   during the first period, cutting off the supply of the first power to the battery.

2. The method of claim 1, further comprising:
   during a second period comprising a period in which wireless communication between the electrical load and a host device and/or another portable device occurs, cutting off the supply of the first power to the electrical load and supplying the second power to the electrical load; and,
   when the second period is terminated, from the first power, charging the battery and supplying power to the electrical load.

3. The method of claim 1, further comprising:
   during a third period from a time point of being connected to the charger, cutting off the supply of the first power to the electrical load and supplying the second power from the battery to the electrical load; and,
   when the third period is terminated, from the first power, charging the battery and supplying power to the electrical load.

4. A device comprising:
   a first switch connected between a first node and a second node;
   a second switch connected between the second node and a third node; and
   a switch controller configured to identify a communication period in which communication occurs,
   wherein the device is configured to receive a current via the first node from an external charger and provide at least a portion of the current to an electrical load through the second node and/or to a battery through the third node, and wherein the switch controller is further configured to turn off the first switch and turn on the second switch during the communication period.

5. The device of claim 4, wherein the switch controller is further configured to turn on the first switch after the communication period.

6. The device of claim 4, wherein the switch controller is further configured to receive a first signal indicating power line communication at the first node and identify the communication period based on the first signal.

7. The device of claim 4, wherein the switch controller is further configured to receive a second signal indicating wireless communication by the electrical load and identify the communication period based on the second signal.

8. The device of claim 7, wherein the wireless communication is based on one of the Bluetooth, Li-Fi, Wireless USB and Zigbee.

9. The device of claim 4, wherein the switch controller is further configured to detect an overdischarged state of the battery and turn off the second switch in the overdischarged state of the battery.

10. The device of claim 4, wherein each of the first switch and the second switch comprises at least one power transistor.

11. The device of claim 4, wherein the switch controller is further configured to turn off the first switch and turn on the second switch, during a period including a time point of being connected to the external charger.

12. A method of controlling power for an electrical load and a battery, the method comprising:
    receiving first power from an external charger;
    identifying a communication period in which communication occurs; and
    cutting off supply of the first power to the electrical load and supplying second power from the battery to the electrical load, during the communication period.

13. The method of claim 12, further comprising supplying the first power to the electrical load and the battery after the communication period.

14. The method of claim 12, wherein the identifying the communication period comprises receiving a first signal indicating power line communication in a path receiving the first power.

15. The method of claim 12, wherein the identifying the communication period comprises receiving a second signal indicating wireless communication by the electrical load.

16. The method of claim 15, wherein the wireless communication is based on one of the Bluetooth, Li-Fi, Wireless USB and Zigbee.

17. The method of claim 12, further comprising:
    detecting an overdischarged state of the battery; and
    turning off the second switch in the overdischarged state of the battery.

18. The method of claim 12, further comprising cutting off supply of the first power to the electrical load and supplying second power from the battery to the electrical load, during a period including a time point of being connected to the external charger.

* * * * *